US012754360B2

(12) United States Patent
Tan et al.

(10) Patent No.: US 12,754,360 B2
(45) Date of Patent: Oct. 6, 2026

(54) FRONTLIGHT MODULE AND DISPLAY APPARATUS

(71) Applicant: HUAWEI TECHNOLOGIES CO., LTD., Shenzhen (CN)

(72) Inventors: Jifeng Tan, Dongguan (CN); Feng Liao, Dongguan (CN); Qiang Wang, Shenzhen (CN); Xiaoshan Chen, Dongguan (CN); Han Yin, Dongguan (CN); Liang Yuan, Dongguan (CN); Ping Pan, Osaka (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/541,145

(22) Filed: Dec. 15, 2023

(65) Prior Publication Data

US 2024/0126000 A1 Apr. 18, 2024

Related U.S. Application Data

(63) Continuation of application No. PCT/CN2022/099272, filed on Jun. 16, 2022.

(30) Foreign Application Priority Data

Jun. 18, 2021 (CN) ........................ 202110680281.X

(51) Int. Cl.
*F21V 8/00* (2006.01)

(52) U.S. Cl.
CPC ........... *G02B 6/005* (2013.01); *G02B 6/0023* (2013.01)

(58) Field of Classification Search
CPC .............................. G02B 6/005; G02B 6/0023
See application file for complete search history.

(56) References Cited

U.S. PATENT DOCUMENTS 5,396,350 A * 3/1995 Beeson ................ G02B 6/0053 359/251
7,001,060 B1 * 2/2006 Kimura ............. G02F 1/133526 349/63

(Continued)

FOREIGN PATENT DOCUMENTS

| | | | |
|---|---|---|---|
| CN | 1598667 | A | 3/2005 |
| CN | 1716024 | A | 1/2006 |
| CN | 102734749 | A | 10/2012 |
| CN | 102767748 | A | 11/2012 |

(Continued)

OTHER PUBLICATIONS

European Search Report for EP Application No. 22824299 dated Oct. 22, 2024, 9 pages.

*Primary Examiner* — Fatima N Farokhrooz

(57) ABSTRACT

The technology of this application relates to a frontlight module and a display apparatus. The frontlight module is disposed on a side of a display panel. The frontlight module includes a light source, a light guide plate, and light guide dots. The light guide plate includes a first surface and a second surface that are disposed opposite to each other. The display panel is disposed facing the second surface. The light source is disposed on a side surface of the light guide plate. A plurality of light guide dots are disposed on the first surface or the second surface of the light guide plate. Each light guide dot has a light guide surface disposed at an angle with respect to a surface of the light guide plate. Light is fully reflected and/or refracted on the light guide surfaces to propagate to the display panel.

19 Claims, 15 Drawing Sheets

(56) References Cited

U.S. PATENT DOCUMENTS

| | | | | |
|---|---|---|---|---|
| 9,121,978 | B2 * | 9/2015 | Huang | G02B 6/0035 |
| 10,459,148 | B1 | 10/2019 | Yoon et al. | |
| 11,002,901 | B2 * | 5/2021 | Wang | G02B 6/0036 |
| 2002/0106182 | A1 * | 8/2002 | Kawashima | G09F 13/0409 385/901 |
| 2005/0276566 | A1 * | 12/2005 | Limura | G02B 6/0048 385/146 |
| 2008/0055928 | A1 * | 3/2008 | Arai | G02B 6/0016 362/609 |
| 2011/0273906 | A1 | 11/2011 | Nichol et al. | |
| 2011/0286242 | A1 | 11/2011 | Ni et al. | |
| 2017/0331253 | A1 * | 11/2017 | Friederich | G02B 6/0008 |
| 2019/0317263 | A1 * | 10/2019 | Han | G02B 6/005 |
| 2022/0179261 | A1 * | 6/2022 | Lin | G02F 1/133553 |

FOREIGN PATENT DOCUMENTS

| | | | | | |
|---|---|---|---|---|---|
| CN | 102767749 | A | | 11/2012 | |
| CN | 103292219 | A | * | 9/2013 | G02B 5/045 |
| CN | 203217213 | U | | 9/2013 | |
| CN | 103713351 | A | * | 4/2014 | G02B 6/0036 |
| CN | 104575269 | A | | 4/2015 | |
| CN | 104832926 | A | | 8/2015 | |
| CN | 104884992 | A | * | 9/2015 | G02B 26/023 |
| CN | 102959460 | B | * | 3/2016 | G02B 6/0038 |
| CN | 105987327 | A | * | 10/2016 | G02B 6/0023 |
| CN | 209895015 | U | | 1/2020 | |
| CN | 111308826 | A | | 6/2020 | |
| JP | 2002231030 | A | * | 8/2002 | G02B 6/0096 |
| JP | 2012089385 | A | * | 5/2012 | G02F 1/133615 |
| JP | 2018101523 | A | | 6/2018 | |
| TW | I378297 | B | * | 12/2012 | |
| TW | I677723 | B | * | 11/2019 | |

* cited by examiner

FRONTLIGHT MODULE AND DISPLAY APPARATUS

CROSS-REFERENCE TO RELATED APPLICATIONS

This application is a continuation of International Application No. PCT/CN2022/099272, filed on Jun. 16, 2022, which claims priority to Chinese Patent Application No. 202110680281.X, filed on Jun. 18, 2021. Both of the aforementioned applications are hereby incorporated by reference in their entireties.

TECHNICAL FIELD

This application relates to the field of display device technologies, and in particular, to a frontlight module and a display apparatus.

BACKGROUND

A reflective display technology uses light reflected on a display panel to implement picture display. In the reflective display technology, if only ambient light is used for display, display effect and contrast vary with brightness of the ambient light. In a weak light environment, display image quality deteriorates significantly, and therefore a frontlight module also needs to be used, to satisfy use scenarios corresponding to different ambient light.

In a conventional technology, a frontlight module may include a front light source and a light guide plate. The front light source is disposed on a side surface of the light guide plate, and a front surface and a rear surface of the light guide plate are respectively attached to a touch panel and a display panel using an optical adhesive. After light emitted by the front light source enters the light guide plate through the side surface of the light guide plate, the light propagates in the light guide plate and is reflected to the display panel, to improve display brightness.

However, some light is reversely output instead of being reflected to the display panel, and is directly emitted to a side viewed by human eyes. This seriously affects display contrast and a color gamut, causing a problem of picture decoloring.

SUMMARY

Embodiments of this application provide a frontlight module and a display apparatus, to reduce reverse light output and improve display effect.

An aspect of embodiments of this application provides a frontlight module. The frontlight module is disposed on a side of a display panel. The frontlight module includes a light source, a light guide plate, and light guide dots. The light guide plate includes a first surface and a second surface that are disposed opposite to each other. The display panel is disposed facing the second surface. The light source is disposed on a side surface of the light guide plate. A plurality of light guide dots are disposed on the first surface or the second surface of the light guide plate. Each light guide dot has a light guide surface disposed at an angle with respect to a surface of the light guide plate. Light is fully reflected and/or refracted on the light guide surfaces to propagate to the display panel.

According to the frontlight module provided in this embodiment of this application, the light guide dots having a specific shape and a specific angle are disposed, so that light can be coupled to the side of the display panel to a maximum extent. In this way, reverse light output can be greatly reduced, and a problem of picture decoloring can be resolved.

In a possible implementation, the light guide dots are disposed on the second surface of the light guide plate, the light guide dots have a trapezoidal structure, top surfaces of the trapezoidal structures are connected to the second surface, a waist on a side of each trapezoidal structure away from the light source forms the light guide surface, and light is fully reflected on the light guide surface to propagate to the display panel.

The light guide dots that have a trapezoidal structure and that are located on the second surface of the light guide plate are disposed, so that light is fully reflected on the light guide surface to propagate to the display panel. In this way, a light output ratio can be greatly improved, and a problem of picture decoloring can be resolved.

In a possible implementation, the angle between the light guide surface and the surface of the light guide plate is θ, an incident angle of light on the side surface of the light guide plate is β, and β and θ satisfy:

$$\beta + \theta \geq 90^\circ + \arcsin(n1/n) \qquad \text{Formula 1}$$

where n is a refractive index of the light guide plate, and n1 is a refractive index of an outer side medium of the light guide plate.

In this way, light can be fully reflected on the light guide surface to propagate to the display panel.

In a possible implementation, a width of the top surface of the trapezoidal structure is D, a height of the trapezoidal structure is H, and D and H satisfy:

$$D/H \leq 1/\tan\beta - \tan(\theta - 90^\circ) \qquad \text{Formula 2}$$

where θ is the angle between the light guide surface and the surface of the light guide plate, and β is an incident angle of light on the side surface of the light guide plate.

In this way, incident light is kept from entering a bottom surface of the trapezoidal structure, so that reverse light output caused by reflection on the bottom surface is avoided.

In a possible implementation, the light guide dot is disposed on the second surface of the light guide plate, the light guide dot has a columnar structure, a side surface of the columnar structure away from the light source forms the light guide surface, some light is reflected on the light guide surface to propagate to the display panel, and some light is refracted on the light guide surface to propagate to the display panel.

The light guide dots that have a columnar structure and that are located on the second surface of the light guide plate are disposed, so that light is reflected or refracted on the light guide surface to propagate to the display panel, to improve a light output ratio.

In a possible implementation, a distance between two adjacent light guide dots is S, and S satisfies:

$$S > H * \tan(\arcsin((n/n1)\sin(90^\circ - \beta))) \qquad \text{Formula 3}$$

where H is a height of the columnar structure, n is a refractive index of the light guide plate, n1 is a refractive index of an outer side medium of the light guide plate, and β is an incident angle of light on the side surface of the light guide plate.

In this way, emergent light from a light guide dot is kept from propagating to a next light guide dot, so that reflection is avoided.

In a possible implementation, a cross section of the columnar structure is a rectangle, a width of the rectangle is D, a height of the rectangle is H, and D and H satisfy:

$$D/H \leq 1/\tan\beta \qquad \text{Formula 4}$$

where β is the incident angle of light on the side surface of the light guide plate.

In this way, incident light is kept from entering a bottom surface of the columnar structure, but completely enters the light guide surface, to avoid reverse light output caused by reflection on the bottom surface.

In a possible implementation, a cross section of the columnar structure is an inverted trapezoid, a top surface of the inverted trapezoid is connected to the second surface, a width of the top surface of the inverted trapezoid is D, a height of the inverted trapezoid is H, and D and H satisfy:

$$D/H \leq 1/\tan\beta + 1/\tan 0 \qquad \text{Formula 5}$$

where β is the incident angle of light on the side surface of the light guide plate, and θ is the angle between the light guide surface and the surface of the light guide plate.

In this way, incident light is kept from entering a bottom surface of the columnar structure, but completely enters the light guide surface, to avoid reverse light output caused by reflection on the bottom surface.

In a possible implementation, the angle θ between the light guide surface and the surface of the light guide plate is between 80° and 90°.

The angle θ between the light guide surface and the surface of the light guide plate is set between 80° and 90°, so that a high light output ratio can be satisfied.

In a possible implementation, the frontlight module further includes a light receiving element, the light receiving element is connected between the light source and the light guide plate, and the light receiving element is configured to converge light emitted by the light source, to enable an emission angle of incident light that enters the light guide plate to be within a preset angle range.

The light receiving element is additionally disposed between the light source and the light guide plate, and an emission angle of the light source is reduced to a specific extent, so that a divergence angle of light that enters the light guide plate is greater than a critical angle of total reflection, and propagation of light in the light guide plate is limited. In addition, the light receiving element narrows a light emitting angle, and can reduce light leakage on a light input side, to reduce a width of a bezel of the display apparatus.

In a possible implementation, the light receiving element includes a microstructural film, and the microstructural film is bonded to the side surface of the light guide plate using an optical adhesive.

In a possible implementation, the microstructural film includes a plurality of light blocking grids, an extension direction of the light blocking grids is perpendicular to a thickness direction of the light guide plate, the plurality of light blocking grids are arranged at intervals in the thickness direction of the light guide plate, and a light transmission region is between two adjacent light blocking grids.

The microstructural film is used as the light receiving element, so that light receiving effect is good, and advantages of small occupied space, simple assembly, and the like are further provided. This helps reduce the width of the bezel of the display apparatus on the light input side, and increases a proportion of a display area of the display apparatus.

In a possible implementation, a cross section of each light blocking grid in the thickness direction of the light guide plate is a triangle, and a sharp angle of the triangle faces a side close to the light guide plate.

The light blocking grids with a sharp angle are disposed, so that light output efficiency can be increased on the basis of a light receiving function.

In a possible implementation, the preset angle range is −35° to 35°.

The light receiving element converges light emitted by the light source, so that the emission angle of incident light that enters the light guide plate is −35° to 35°, to limit propagation of light in the light guide plate and reduce light leakage on the light input side.

In a possible implementation, the frontlight module further includes a refractive index buffer layer, the refractive index buffer layer is disposed on a side of the light guide plate facing the light guide dots, and a refractive index of the refractive index buffer layer is less than the refractive index of the light guide plate.

The refractive index buffer layer with a lower refractive index is additionally disposed, so that the critical angle of total reflection can be reduced, to increase light reflection efficiency and reduce an amount of reverse light output.

In a possible implementation, a buffer rate of the refractive index buffer layer is within a range of 1.2 to 1.6.

Another aspect of embodiments of this application provides a display apparatus, including a display panel and the foregoing frontlight module. The display panel is connected to the frontlight module using an optical adhesive.

Embodiments of this application provide the frontlight module and the display apparatus. The light guide dots having a specific shape and a specific angle are disposed, so that light can be coupled to the side of the display panel to a maximum extent. In this way, reverse light output can be greatly reduced, and a problem of picture decoloring can be resolved. In addition, the light receiving element is additionally disposed between the light source and the light guide plate, and an emission angle of the light source is reduced to a specific extent, so that a divergence angle of light that enters the light guide plate is greater than a critical angle of total reflection, and propagation of light in the light guide plate is limited. In addition, the light receiving element narrows a light emitting angle, and can reduce light leakage on a light input side, to reduce a width of a bezel of the display apparatus.

REFERENCE NUMERALS

100: light source; 21: electronic paper display panel; 22: light guide plate; 23: optical adhesive; 24: touchscreen; 25: cover plate; 26: ink; 27: coating; 28: scattering dot; 300: light receiving element; 31: microstructural film; 311: light blocking grid; 312: light transmission region; 32: reflection element; 321: refractive plane; 322: groove; 323: convex surface; 324: reflective arc surface; 33: biconvex lens; 34: planoconvex lens; 400: light guide dot; 401: light guide surface; 402: bottom surface; 500: refractive index buffer layer; AA: display region; BB: bezel region.

DESCRIPTION OF EMBODIMENTS

In a conventional technology, in addition to a combination of a liquid crystal display panel and a backlight structure, a display apparatus further includes a reflective display technology. The reflective display technology may implement picture display in an ambient light reflection manner, and a front light source is added to implement good display effect, achieving advantages of low blue light, ultra-low power consumption, a light and thin body, low costs, and the like.

An electronic paper technology, namely, an electrophoresis display (EPD) technology, is one of reflective display technologies, which is widely used in the market of electronic readers. Different from a conventional liquid crystal display (LCD)/organic light-emitting diode (OLED) screen, an EPD uses ambient light for display. Display effect is limited by brightness of the ambient light, and contrast varies accordingly. Therefore, a reflective display has an obvious display advantage under strong light. In a weak light environment, display image quality deteriorates significantly, and display cannot be performed in a dark room. Therefore, to satisfy different use scenarios, a front light source also needs to be used.

Figure 1:
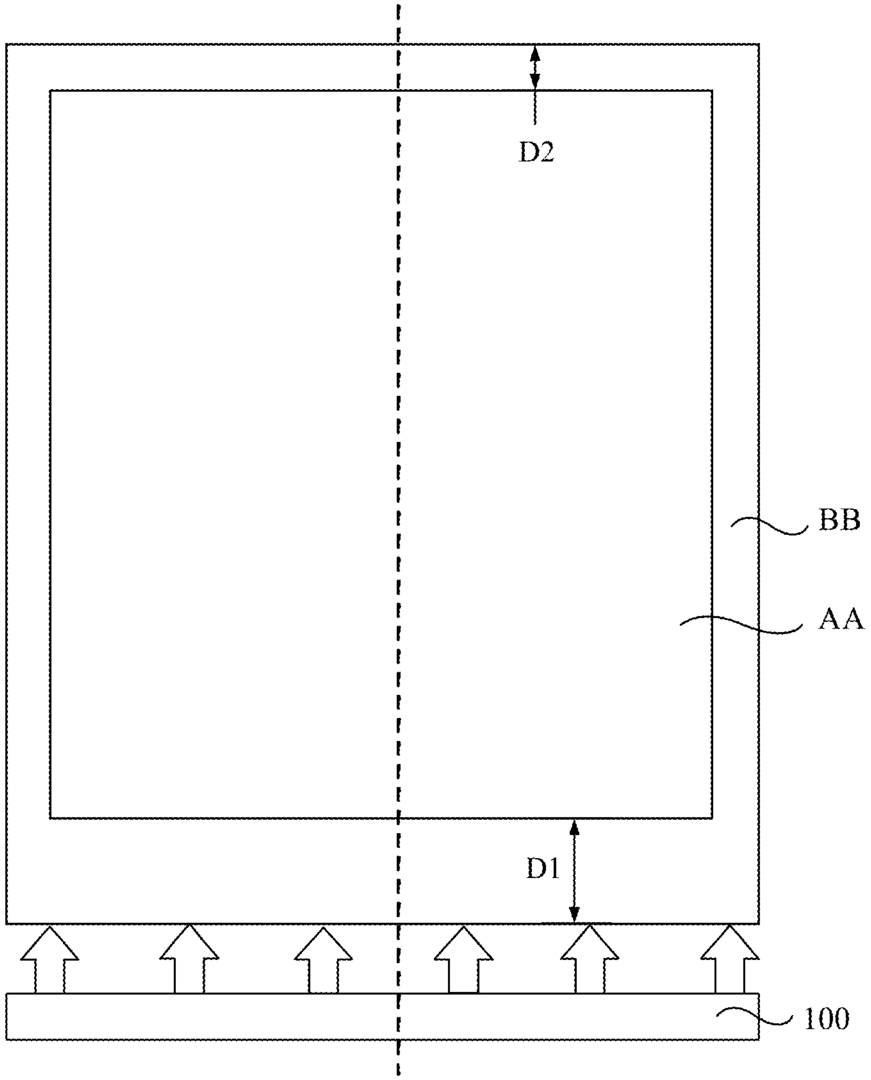
FIG. 1 RELATED ART
FIG. 1 is an example schematic diagram of a front structure of an electronic paper display apparatus according to a conventional technology.
Figure 2:
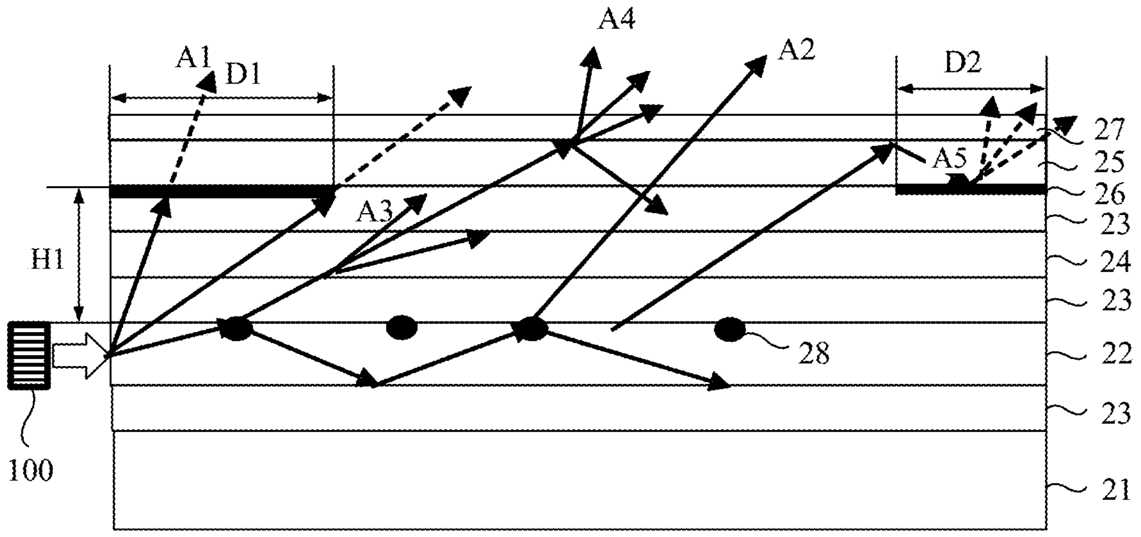
FIG. 2 RELATED ART
FIG. 2 is an example schematic diagram of a stacked structure of the electronic paper display apparatus according to the conventional technology.

FIG. 1 is a schematic diagram of a front structure of an electronic paper display apparatus according to a conventional technology. FIG. 2 is a schematic diagram of a stacked structure of the electronic paper display apparatus according to the conventional technology. FIG. 2 corresponds to a cross section at a dashed line position in FIG. 1. Refer to FIG. 1 and FIG. 2. The electronic paper display apparatus provided in the conventional technology includes a light source 100, an electronic paper display panel 21, a light guide plate 22, an optical adhesive 23, a touchscreen 24, a cover plate 25, ink 26, a coating 27, and scattering dots 28.

The electronic paper display panel 21, the light guide plate 22, the touchscreen 24, and the cover plate 25 are sequentially stacked from bottom to top. The electronic paper display panel 21 is combined with the light guide plate 22 using the optical adhesive 23. The light guide plate 22 is bonded to the touchscreen 24 using the optical adhesive 23. The touchscreen 24 is bonded to the cover plate 25 using the optical adhesive 23. The coating 27 is coated on an outer surface of the cover plate 25. The light source 100 is disposed on a side surface of the light guide plate 22. Incident light enters the light guide plate 22 through the side surface of the light guide plate 22, and is reflected to the electronic paper display panel 21 through an upper surface of the light guide plate 22, to improve display brightness of the electronic paper display panel 21.

As shown by light A1 in FIG. 2, because a refractive index of the optical adhesive 23 on the upper surface and a lower surface of the light guide plate 22 is lower than a refractive index of the light guide plate 22, light emitted by the light source 100 may be partially directly emitted. This part of light is leaked from a light input side of the light guide plate 22, and needs to be blocked by using the ink 26, and a width of ink on the light input side is D1. On the other three sides, a width of ink at a bezel region BB is D2. Bezels on the three sides are used to reduce light leakage at edges and fluorescence effect caused by ink scattering. In addition, when power consumption of the light source 100 is low, an area of a light mixing region on an light input side needs to be increased. As a result, D1 is greater than D2, and a bezel on the light input side is very wide, affecting an area of a display region AA.

A plurality of scattering dots 28 are disposed on the upper surface of the light guide plate 22. Light enters the scattering dots 28 and is reflected at the scattering dots 28, to improve efficiency of downward light guiding. However, as shown in A2 in FIG. 2, there is still reverse light output of part of light at the scattering dots 28. As shown in A3 in FIG. 2, a grid structure inside the touchscreen 24 causes scattering of part of light. As shown in A4 in FIG. 2, the coating 27 destroys a total reflection interface of the cover plate 25. As shown in A5 in FIG. 2, edge light leakage and ink scattering also cause reverse light output of part of light. The reverse light output reduces light emitting efficiency, and lowers display contrast and a color gamut of the electronic paper display panel 21, causing a problem of picture decoloring.

It should be noted that, a ratio of energy emitted to an EPD side when a frontlight is enabled to energy reversely emitted to a human eye side, that is, a light output ratio, is a parameter directly related to the display contrast. When the light output ratio is greater than 100, when the frontlight is enabled, there is basically no adverse impact on display image quality.

In view of the foregoing problem, embodiments of this application provide a frontlight module and a display apparatus. The light guide dots having a specific shape and a specific angle are disposed, so that light is coupled to the side of the electronic paper display panel to a maximum extent. In this way, reverse light output can be greatly reduced, and a problem of picture decoloring can be resolved. In addition, the light receiving element is additionally disposed between the light source and the light guide plate, and an emission angle of the light source is reduced to a specific extent, so that a divergence angle of light that enters the light guide plate is greater than a critical angle of total reflection, and propagation of light in the light guide plate is limited. In addition, the light receiving element narrows a light emitting angle, and can reduce light leakage on a light input side, reducing a width of a bezel of the display apparatus.

The following specifically describes structures and principles of the frontlight module and the display apparatus provided in this application with reference to the accompanying drawings and specific embodiments.

An embodiment of this application provides a display apparatus having a frontlight module. The display apparatus uses a reflective display technology. The frontlight module is disposed on a side of a display panel close to human eyes, and implements picture display through light cooperation between ambient light and the frontlight module. The display apparatus may include an electronic paper display device using an electrophoresis display EPD technology, for example, an e-reader, a watch, an outdoor billboard, a bus signboard, or the like. The display apparatus may further include a device such as a watch, a television, or a computer using a reflective liquid crystal display LCD. The display apparatus may further include a Liquid Crystal on Silicon (LCOS) projector, that is, a projector using a novel reflective micro LCD projection technology. The display apparatus may further include other types, and details are not listed one by one herein.

The following describes the structures of the frontlight module and the display apparatus provided in this application by using an example in which an e-reader using the electrophoresis display EPD technology is used as the display apparatus.

Figure 3:
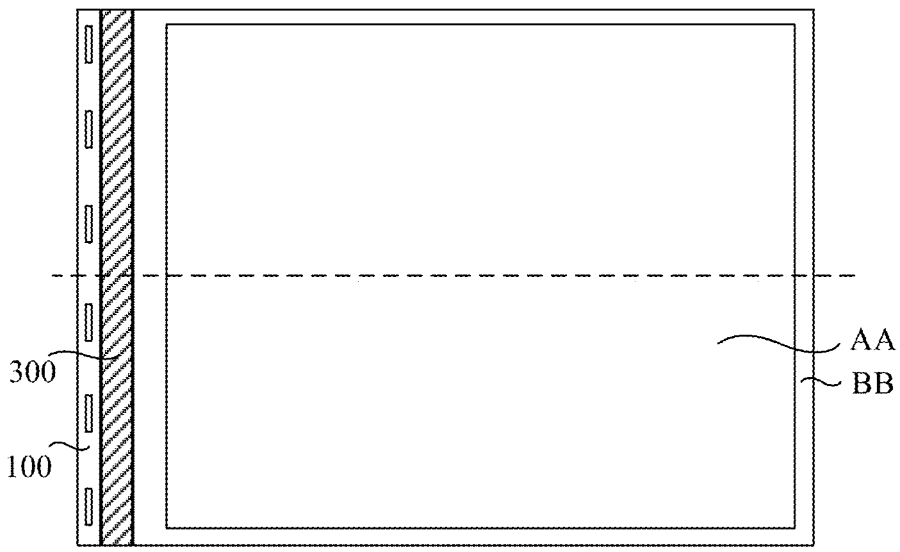
FIG. 3 is an example schematic diagram of a front structure of an electronic paper display apparatus according to an embodiment of this application.
Figure 4:
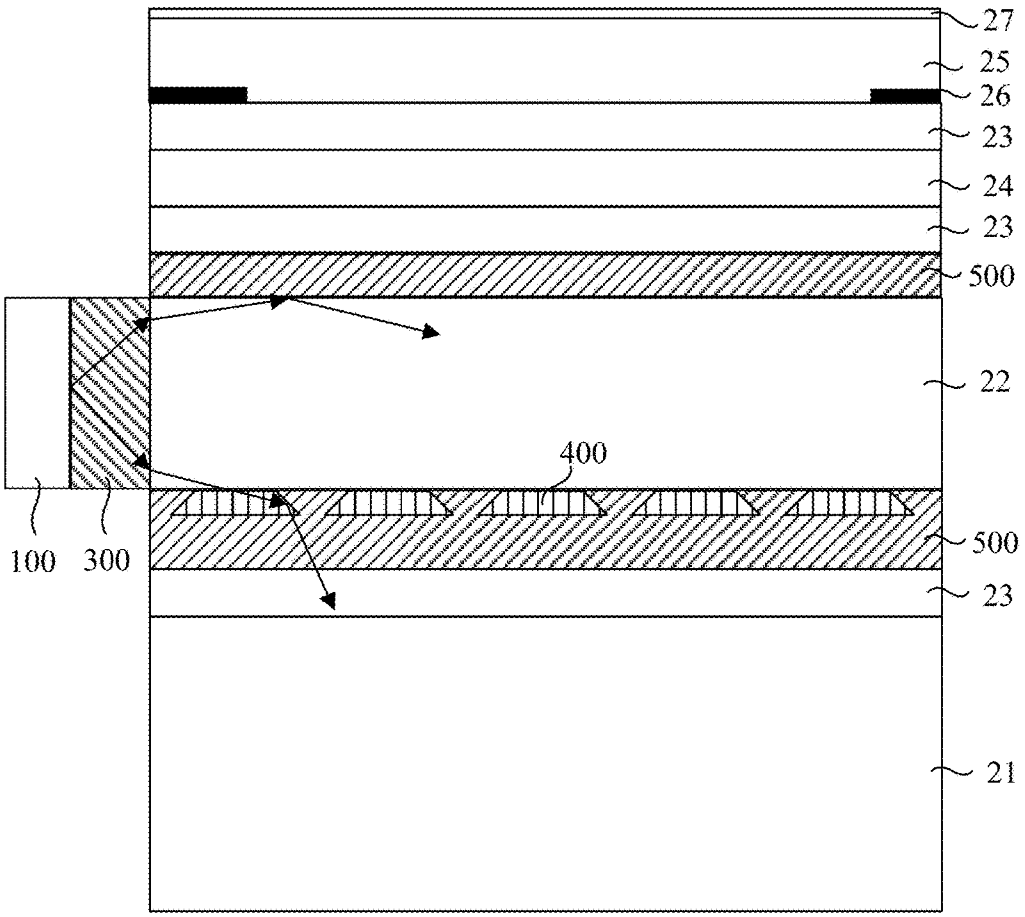
FIG. 4 is an example schematic diagram of a stacked structure of an electronic paper display apparatus according to an embodiment of this application.

A display panel in the e-reader is an electronic paper display panel EPD. FIG. 3 is a schematic diagram of a front structure of an electronic paper display apparatus according to an embodiment of this application. FIG. 4 is a schematic diagram of a stacked structure of an electronic paper display apparatus according to an embodiment of this application. FIG. 4 corresponds to a cross section at a dashed line position in FIG. 3. Refer to FIG. 3 and FIG. 4. This embodiment of this application provides an electronic paper display apparatus, which may include an electronic paper display panel 21 and a frontlight module. The frontlight module may include a light source 100, a light guide plate 22, an optical adhesive 23, a touchscreen 24, a cover plate 25, ink 26, a coating 27, a light receiving element 300, light guide dots 400, and a refractive index buffer layer 500.

It should be understood that the light guide plate 22 includes a first surface and a second surface that are disposed opposite to each other, and the electronic paper display panel may be disposed facing the first surface or facing the second surface. For ease of description, in this embodiment of this application, the first surface may be defined as an upper surface, and the second surface may be defined as a lower surface. Definitions of an upper direction and a lower direction are consistent with those in the figure. The following describes an overall structure of the frontlight module by using an example in which the electronic paper display panel is disposed below the frontlight module.

The refractive index buffer layer 500 may be disposed on an upper layer or a lower layer of the light guide plate 22. Alternatively, the refractive index buffer layer 500 is disposed on both the upper layer and the lower layer of the light guide plate 22. The refractive index buffer layer 500 located on a lower side of the light guide plate 22 is bonded to the electronic paper display panel 21 using the optical adhesive 23. The refractive index buffer layer 500 located on an upper side of the light guide plate 22 is bonded to the touchscreen 24 using the optical adhesive 23. The touchscreen 24 is bonded to the cover plate 25 using the optical adhesive 23. The coating 27 is coated on an outer surface of the cover plate 25.

A refractive index of the light guide plate 22 is n. It is assumed that a refractive index of an outer side medium of the light guide plate 22 is n1. If incident light needs to be fully reflected and propagate in the light guide plate 22, $\beta \leq 90° - \arcsin(n1/n)$ needs to be satisfied. In a conventional technology, the outer side medium of the light guide plate 22 is an optical adhesive, and a refractive index of the optical adhesive is high. As a result, a maximum value of β is small, and light reflection efficiency is low. In this embodiment of this application, the refractive index buffer layer 500 with a lower refractive index is additionally disposed, so that the critical angle of total reflection can be reduced, to increase light reflection efficiency and reduce an amount of reverse light output.

The light source 100 and the light receiving element 300 are disposed on a side surface of the light guide plate 22. The light source 100 is a light emitting element, for example, may be an electronic light emitting diode LED bead structure. The light receiving element 300 may be additionally disposed between the light source 100 and the light guide plate 22. After passing through the light receiving element 300, light emitted by the light source enters the light guide plate 22 through the side surface of the light guide plate 22. The light receiving element 300 may reduce a divergence angle of light emitted by the light source 100 to some extent. For example, an emission angle of light that enters the light guide plate 22 through the light receiving element 300 is within a range of ±35°.

In addition, the light guide dots 400 are further disposed on the upper side or a lower side of the light guide plate 22. The light guide dots 400 may enable light to be fully reflected or refracted on a light guide surface of the light guide dots 400 to change a light path, so that the light is reflected or refracted downward, and the amount of reverse light output is further reduced.

Generally, in this embodiment of this application, the light receiving element 300, the light guide dots 400, and the refractive index buffer layer 500 are disposed, and can separately reduce the amount of reverse light output.

There are a plurality of specific implementations of the light receiving element 300. The following describes the light receiving element 300 provided in this embodiment of this application with reference to a plurality of examples.

Figure 5:
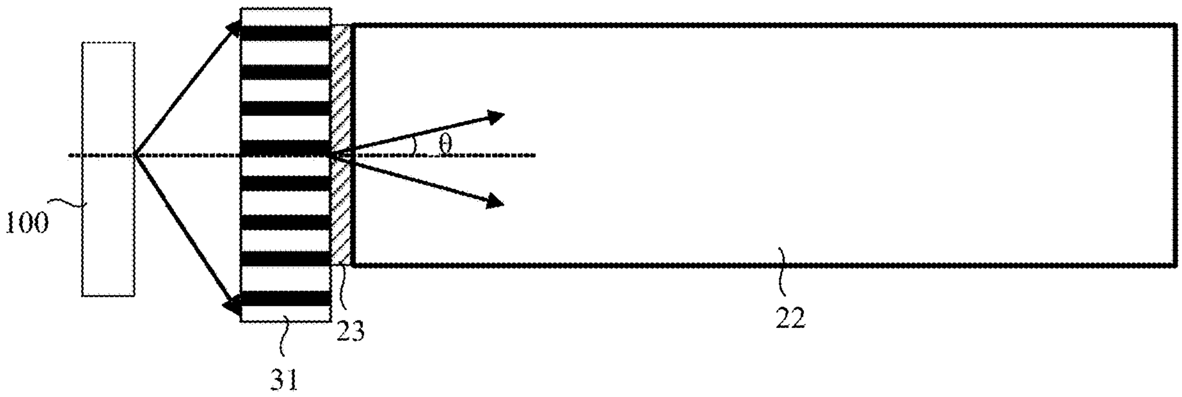
FIG. 5 is an example schematic diagram of structures of a light receiving element and a light guide plate according to an embodiment of this application.

FIG. 5 is a schematic diagram of structures of a light receiving element and a light guide plate according to an embodiment of this application. Refer to FIG. 5. In a possible implementation, the light receiving element 300 may be a microstructural film. The microstructural film is disposed between the light source 100 and the light guide plate 22. A thickness direction of the microstructural film is perpendicular to a plane on which the light guide plate 22 is located, and the microstructural film may be attached to the side surface of the light guide plate 22 by using an optical adhesive to implement assembly.

Figure 6:
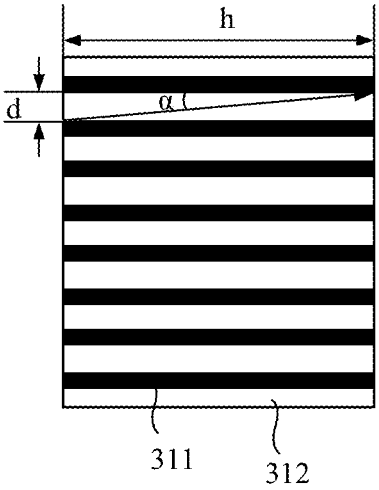
FIG. 6 is an example schematic diagram of a structure of a microstructural film according to an embodiment of this application.

FIG. 6 is a schematic diagram of a structure of a microstructural film according to an embodiment of this application. Refer to FIG. 6. A microstructural film 31 may include light blocking grids 311, and a plurality of light blocking grids 311 are arranged at intervals. An extension direction of the light blocking grids 311 is a thickness direction of the microstructural film 31. Light cannot pass through the light blocking grids 311. Light is reflected at a boundary of the light blocking grids 311. An opening between adjacent light blocking grids 311 is a light transmission region 312.

The light blocking grids 311 may be disposed as columnar structures, and a size of the light transmission region 312 determines a light receiving angle of the microstructural film 31. In FIG. 5, a thickness of the microstructural film 31 is h, and a width of the light transmission region 312 is d. Therefore, a maximum light output divergence angle α of the microstructural film 31 satisfies $\alpha = \arctan(d/h)$.

A black light-absorbing material for forming the light blocking grids 311 may be formed by an organic material doped with a black dye, and an embossing resist for forming the light transmission region 312 may be formed by a high-transmittance organic polymer material. The microstructural film 31 may be manufactured by using an embossing and filling process or a layer-by-layer coating process.

Figure 7A:
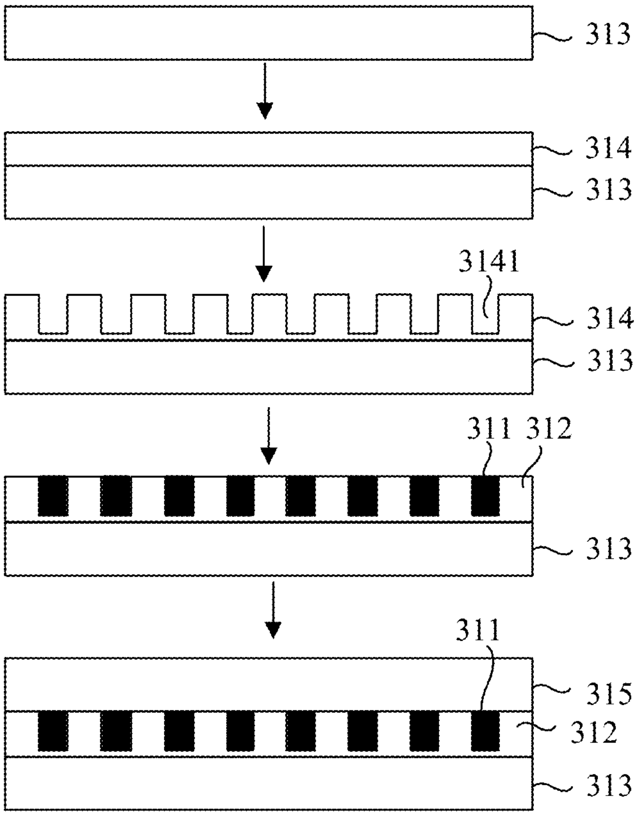
FIG. 7*a* is an example schematic flowchart of a manufacturing process of a microstructural film according to an embodiment of this application.

FIG. 7*a* is a schematic flowchart of a manufacturing process of a microstructural film according to an embodiment of this application. Refer to FIG. 7*a*. A procedure of the embossing and filling process includes: first, providing a substrate 313; then coating an embossing adhesive 314 on the substrate 313; then, embossing the embossing adhesive 314 by using a mold, to form a groove 3141 in the embossing adhesive 314; then filling the groove 3141 with a black light-absorbing material, to form light blocking grids 311, and forming a light transmission region 312 by using the embossing adhesive between the light blocking grids 311; and finally, attaching a protective layer 315, and performing cutting to obtain the microstructural film 31 of an appropriate size.

Figure 7B:
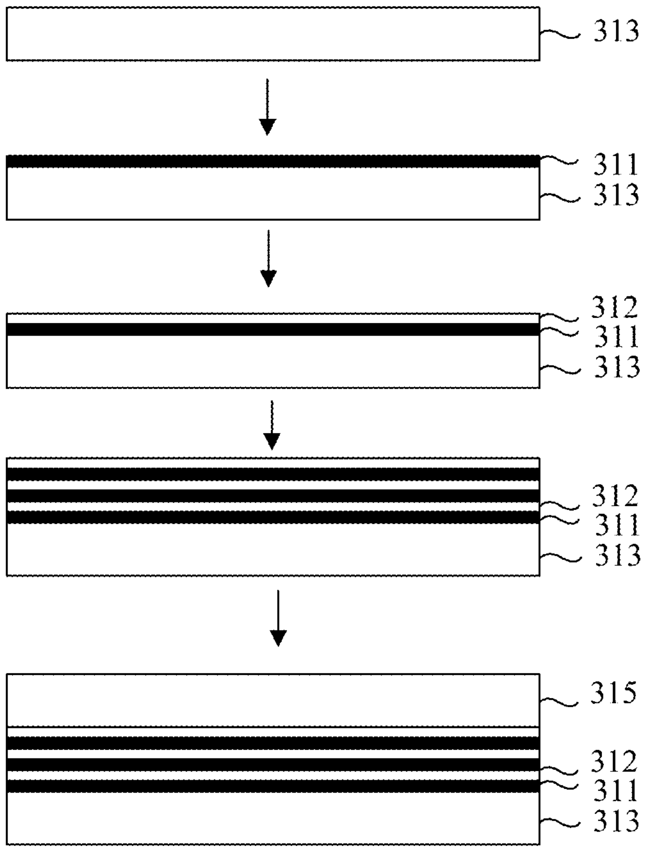
FIG. 7*b* is an example schematic flowchart of another manufacturing process of a microstructural film according to an embodiment of this application.

FIG. 7*b* is a schematic flowchart of another manufacturing process of a microstructural film according to an embodiment of this application. Refer to FIG. 7*b*. A procedure of the layer-by-layer coating process may include: first, providing a substrate 313; then coating a layer of black light-absorbing material on the substrate 313 to form light blocking grids 311; then coating a layer of transparent material to form a light transmission region 312; repeatedly and alternately coating the black light-absorbing material and the transparent material to form a plurality of layers of light blocking grids 311 and the light transmission region 312; and finally, attaching a protective layer 315, and performing cutting to obtain the microstructural film 31 of an appropriate size.

Figure 8:
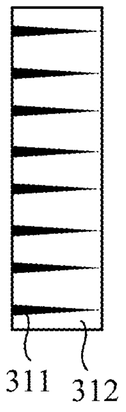
FIG. 8 is an example schematic diagram of another structure of a microstructural film according to an embodiment of this application.

FIG. 8 is a schematic diagram of another structure of a microstructural film according to an embodiment of this application. Refer to FIG. 8. The light blocking grids 311 may be disposed as wedge-shaped structures, and a sharp angle of the wedge-shaped structure is located on a side close to the light guide plate 22, so that light output efficiency can be improved on the basis of a light receiving function. In this case, a width d of the light transmission region 312 may be considered as a width of a side away from the light guide plate 22.

For a manufacturing process of the light blocking grids 311 with the wedge-shaped structure, the embossing and filling process provided in FIG. 7*a* may be used. In the embossing step, different molds are used to emboss a triangular groove, so that the light blocking grids 311 formed after filling may be a wedge-shaped structure.

Figure 9:
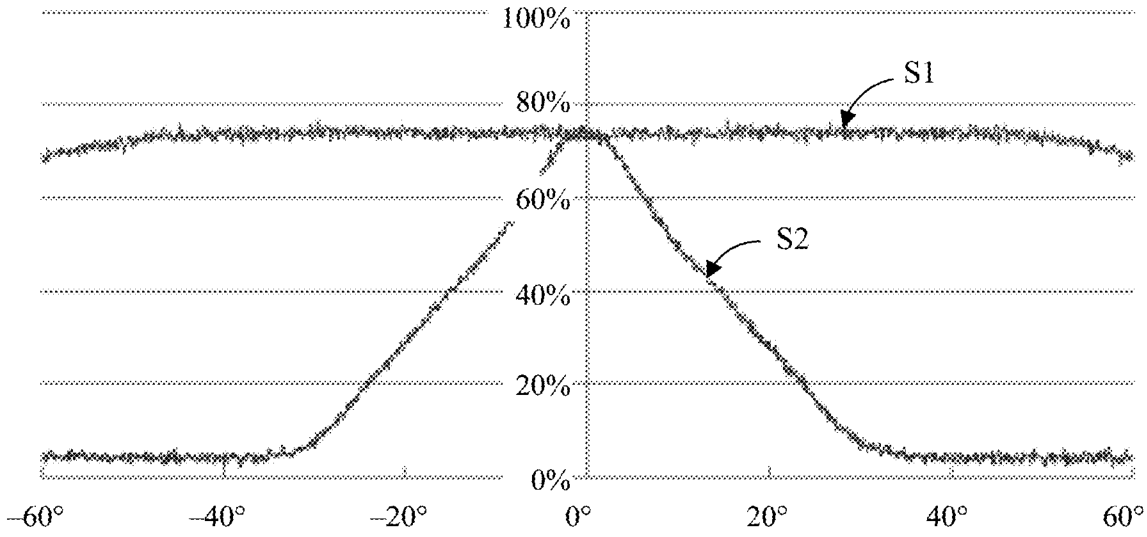
FIG. 9 is an example simulation effect diagram of a microstructural film according to an embodiment of this application.

In a specific example, h is 100 um, d is 47 um, and a maximum light output divergence angle θ of the microstructural film 31 is approximately 25 degrees. FIG. 9 is a simulation effect diagram of a microstructural film according to an embodiment of this application. In the figure, a horizontal coordinate represents a light angle, a vertical coordinate represents a distribution probability, a curve S1 represents light that does not pass through the microstructural film, and a curve S2 represents light that passes through the microstructural film. Refer to FIG. 9. It can be learned that, in an actual test, after light is received by the microstructural film 31, a divergence angle of light may be controlled within a range of ±35°.

The microstructural film 31 is used as the light receiving element 300. In addition to good light receiving effect, advantages of small occupied space, simple assembly, and the like of the microstructural film 31 are further provided. This helps reduce the width of the bezel of the display apparatus on the light input side, and increases a proportion of a display area of the display apparatus.

Figure 10:
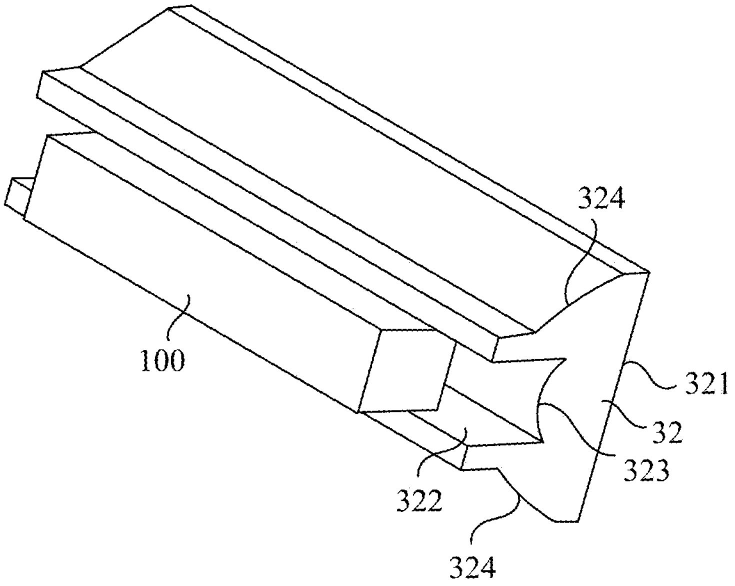
FIG. 10 is an example schematic diagram of another structure of a light receiving element according to an embodiment of this application.
Figure 11:
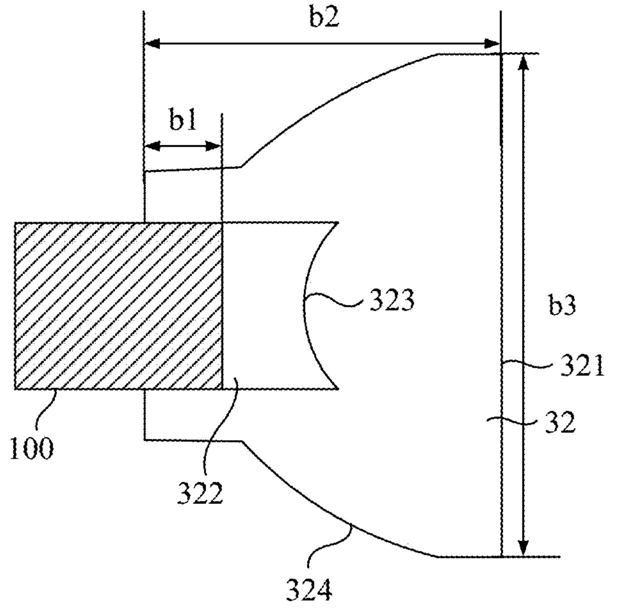
FIG. 11 is an example side view corresponding to FIG. 10.

FIG. 10 is a schematic diagram of another structure of a light receiving element according to an embodiment of this application. FIG. 11 is a side view corresponding to FIG. 10. Refer to FIG. 10 and FIG. 11. In another possible implementation, the light receiving element 300 may include a reflection element 32. The reflection element 32 is disposed on a side surface of the light guide plate 22. A side of the reflection element 32 close to the light guide plate 22 is disposed as a refractive plane 321. A groove 322 is provided in a side of the reflection element 32 away from the light guide plate 22. A light source 100 is embedded or clamped in the groove 322. The light source 100 outputs from a side, that is, emits light toward the plane 321. A surface of the groove 322 opposite to the refractive plane 321 protrudes away from the refractive plane 321, to form a convex surface 323. The reflection element 32 further includes two reflective arc surfaces 324. The reflective arc surfaces 324 are symmetrically disposed relative to the groove 322, and protrude to the outside of the reflection element 32.

Figure 12:
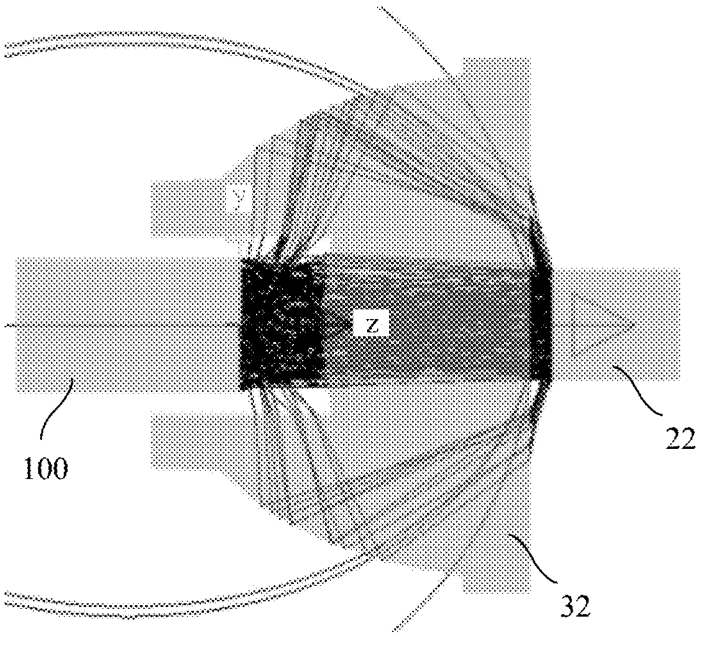
FIG. 12 is an example schematic diagram of a light path at a reflection element according to an embodiment of this application.

FIG. 12 is a schematic diagram of a light path at a reflection element according to an embodiment of this application. Refer to FIG. 11. After the light source 100 emits light, part of light with a large divergence angle enters the reflection element 32, and after being reflected by the reflective arc surface 324 and then refracted by the refractive plane 321, the divergence angle is greatly reduced. Another part of light with a small divergence angle decreases after being refracted by the convex surface 323 and refracted by the refractive plane 321, and then enters the light guide plate 22.

Figure 13:
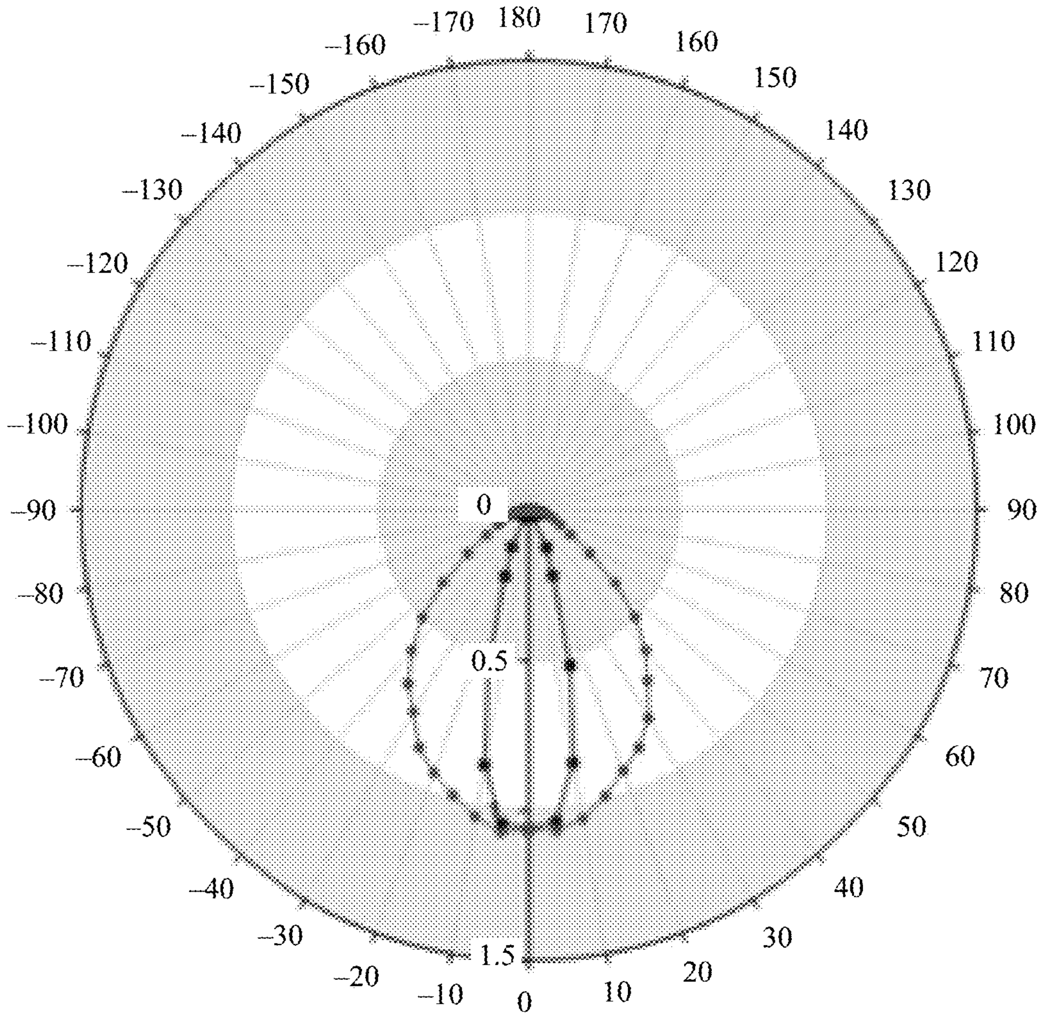
FIG. 13 is an example simulation effect diagram of a reflection element according to an embodiment of this application.

In a specific example, a length b1 of the light source 100 extending into the groove 322 is 0.2 mm, a length b2 of the reflection element 32 is 0.85 mm, and a width b3 of the reflection element 32 is 1.2 mm. FIG. 13 is a simulation effect diagram of a reflection element according to an embodiment of this application. A circumferential coordinate represents a light angle, and a radial coordinate represents a light intensity value. Refer to FIG. 13. It can be learned that, in an actual test, after light is received by the reflection element 32, a divergence angle of light may be controlled within a range of ±35°.

Figure 14:
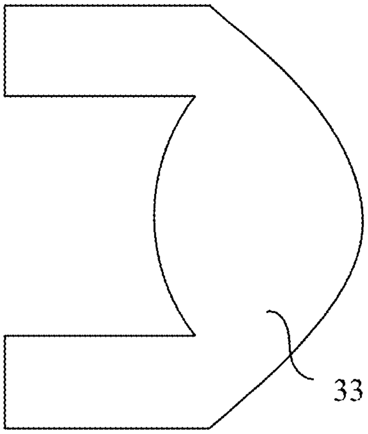
FIG. 14 is an example schematic diagram of a structure of a biconvex lens according to an embodiment of this application.
Figure 15:
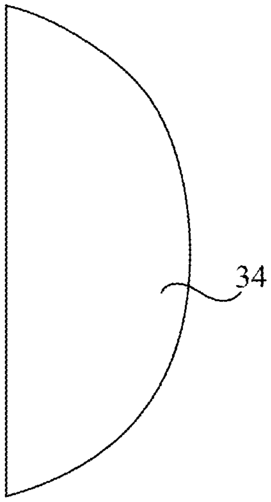
FIG. 15 is an example schematic diagram of a structure of a planoconvex lens according to an embodiment of this application.

In still another possible implementation, the light receiving element 300 may be alternatively a lens or a combination structure of lenses. FIG. 14 is a schematic diagram of a structure of a biconvex lens according to an embodiment of this application. Refer to FIG. 14. The light receiving element 300 may be a biconvex lens 33. The biconvex lens 33 has a function of converging light. FIG. 15 is a schematic diagram of a structure of a planoconvex lens according to an embodiment of this application. Refer to FIG. 15. The light receiving element 300 may be a planoconvex lens 34. The planoconvex lens 34 also has a function of converging light. Specific sizes of the biconvex lens 33 and the planoconvex lens 34 are not specifically limited in this embodiment of this application.

In addition to the foregoing plurality of examples, the light receiving element 300 may be another structure that is formed by a structure such as a reflective element, a refractory element, or the like and that has a function of converging light. After the light receiving element 300 narrows an incident angle of light, an emission angle of light that enters the light guide plate 22 is greater than a critical angle of total reflection, so that propagation of light in the light guide plate 22 can be limited. In addition, after the light receiving element 300 narrows the incident angle of light, light leakage on the light input side can be reduced.

In addition, there are a plurality of specific implementations of the light guide dots 400. The following describes the light guide dots 400 provided in this embodiment of this application with reference to a plurality of examples.

In a possible implementation, the light guide dots 400 may be disposed on a lower side of the light guide plate 22, and a light guide surface 401 of the light guide dots 400 is used, so that light is fully reflected on the light guide surface 401, to achieve effect of high light output.

Figure 16:
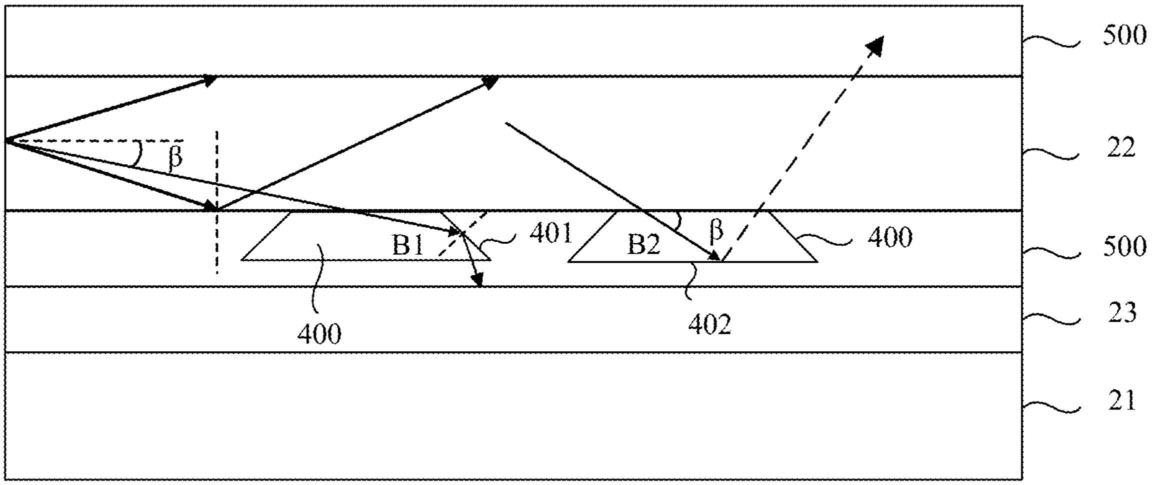
FIG. 16 is an example schematic diagram of light paths in a light guide plate and light guide dots according to an embodiment of this application.

FIG. 16 is a schematic diagram of light paths in a light guide plate and light guide dots according to an embodiment of this application. Refer to FIG. 16, the light guide dots 400 may be disposed as trapezoidal structures, and the plurality of light guide dots 400 are distributed on the lower side of the light guide plate 22. Top surfaces of the trapezoidal structures are attached to a lower surface of the light guide plate 22. A length of a bottom surface of the trapezoidal structure is greater than a length of the top surface, and a waist of the trapezoidal structure away from a light input side forms the light guide surface 401. As shown by light B1 in the figure, when incident light is irradiated on the light guide surface 401, the light is reflected downward, that is, reflected to the electronic paper display panel 21. As shown by light B2 in the figure, when the incident light is irradiated on a bottom surface 402 of the trapezoidal structure, the light is reflected upward, to form reverse light output.

To reduce reverse light output, in this embodiment of this application, a shape and a size of the light guide dots 400 are more specifically limited, so that light such as B1 is fully reflected on the light guide surface 401, and light B2 is avoided.

Figure 17A:
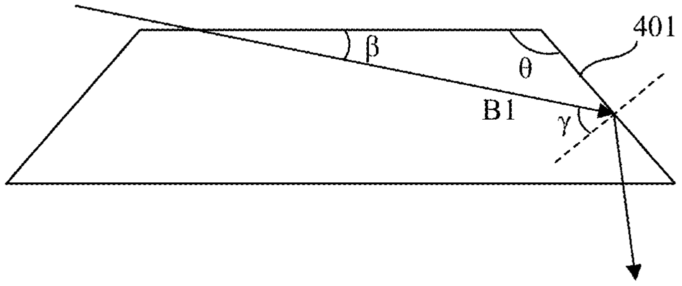
FIG. 17*a* is an example schematic diagram of reflection of light on a light guide surface according to an embodiment of this application.

FIG. 17*a* is a schematic diagram of reflection of light on a light guide surface according to an embodiment of this application. Refer to FIG. 17*a*. An angle between the light guide surface 401 and the lower surface of the light guide plate 22 is $\theta$, an angle between incident light and a horizontal normal is $\beta$, and an incident angle of light irradiated on the light guide surface 401 is $\gamma$. A refractive index of the light guide plate 22 is n, and a refractive index of the refractive index buffer layer 500 is n1. It can be known from the refraction law that, a critical angle of total reflection of light entering the light guide surface 401 is $\gamma 0=\arcsin(n1/n)$. To satisfy total reflection and downward propagation of light on the light guide surface 401, $\gamma \geq \gamma 0$ needs to be satisfied. According to the law that a sum of three angles of a triangle is equal to 180°, $\beta+\theta+90°-\gamma=180°$, and it may be obtained that $\gamma=\beta+\theta-90°$. In summary, to implement total reflection and downward propagation of light on the light guide surface 401, the following needs to be satisfied:

$$\beta+\theta \geq 90°+\arcsin(n1/n) \quad \text{Formula 1}$$

Figure 17B:
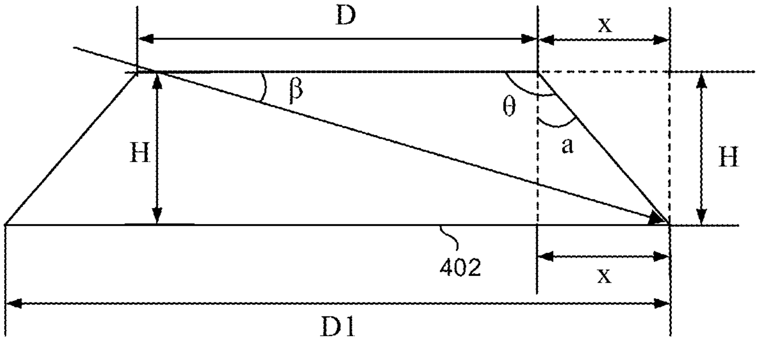
FIG. 17*b* is an example schematic diagram of a limiting case of reflection of light on a bottom surface of a light guide dot according to an embodiment of this application.

FIG. 17*b* is a schematic diagram of a limiting case of reflection of light on a bottom surface of a light guide dot according to an embodiment of this application. Refer to FIG. 17*b*. For light guide dots 400 with a trapezoidal structure, a length of a top surface is D, a length of the bottom surface 402 is D1, and a height is H. A vertical line is drawn from a right vertex of a trapezoid to the bottom surface 402. It is assumed that a distance between an intersection of the vertical line and the bottom surface 402 and a right bottom point of the trapezoid is x. It can be learned from a trigonometric function that tan(θ−90°)=x/H. In addition, tan β=H/(D+x), and it can be obtained that in a limiting case: D/H=1/tan β−tan(θ−90°). In summary, to keep incident light from entering the bottom surface 402 and enable the incident light to completely enter the light guide surface 401, to avoid reverse light output caused by reflection on the bottom surface 402, the following needs to be satisfied:

$$D/H \leq 1/\tan\beta - \tan(\theta - 90°) \quad \text{Formula 2}$$

In addition, to enable incident light to be fully reflected and propagate in the light guide plate 22, β≤90°−arcsin(n1/n) needs to be satisfied.

Next, optional ranges of key factors are obtained through simulation results.

First, under a condition that θ=135° and n=1.59, different values of a refractive index n1 of the refractive index buffer layer 500 are simulated, so that corresponding values of a light output ratio may be obtained through simulation, as shown in Table 1:

TABLE 1

| n1 | θ | n | Light output ratio |
|---|---|---|---|
| 1.47 | 135 | 1.59 | 23231 |
| 1.3 | 135 | 1.59 | 674 |
| 1.25 | 135 | 1.59 | 68 |
| 1.0 | 135 | 1.59 | 3 |

It can be learned from Table 1 that, on the premise of n1<n, when a value of n1 is larger, the light output ratio is higher. In this embodiment of this application, n1 may be selected to be in a range of 1.2 to 1.6.

Under a condition that θ=115°, n=1.59, and n1=1.47, values of corresponding light output ratios may be simulated by simulating different values of a maximum light input angle β max, as shown in Table 2:

TABLE 2

| θ | n | n1 | βmax | Light output ratio |
|---|---|---|---|---|
| 115 | 1.59 | 1.47 | 10 | 17325 |
| 115 | 1.59 | 1.47 | 15 | 17373 |
| 115 | 1.59 | 1.47 | 20 | 12506 |
| 115 | 1.59 | 1.47 | 22 | 26601 |

It can be learned from Table 2 that when a value of the light input angle β max is larger, the light output ratio is higher.

Under a condition that β=22, n=1.59, and n1=1.47, different values of θ and D/H are simulated, and corresponding values of the light output ratio may be obtained through simulation, as shown in Table 3:

TABLE 3

| θ/° | D/H | Light output ratio |
|---|---|---|
| 90 | 0.42 | 6433 |
| 115 | 0.27 | 26601 |
| 135 | 1.41 | 23231 |
| 150 | 1.83 | 16094 |
| 160 | 2.04 | 3 |

It can be learned from Table 3 that when θ is less than 160, the light output ratio is greater than 1000. In this embodiment of this application, θ may be selected to be in a range of 90° to 160°.

A material of the light guide dots 400 may be consistent with a material of the light guide plate 22, and the light guide dots 400 and the light guide plate 22 are embossed by using a mold and a hot embossing process. Alternatively, a material of the light guide dots 400 may be an ultraviolet-cured adhesive, and a refractive index of the ultraviolet-cured adhesive is close to a refractive index of the light guide plate 22, and is greater than a refractive index of the external optical adhesive. A layer of ultraviolet-cured adhesive is coated on the light guide plate 22, and structures of the light guide dots 400 are embossed by using a mold.

Figure 18:
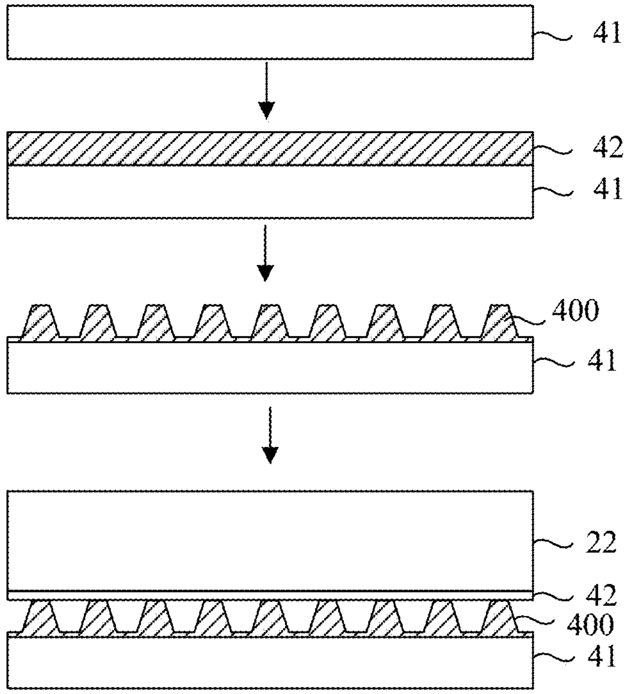
FIG. 18 is an example schematic flowchart of a manufacturing process of light guide dots according to an embodiment of this application.

For the trapezoidal light guide dots 400 disposed below the light guide plate 22 provided in this embodiment of this application, the structures of the light guide dots 400 are prone to damage during mold removal. Therefore, the light guide dots cannot be directly formed by using an embossing process. FIG. 18 is a schematic flowchart of a manufacturing process of light guide dots according to an embodiment of this application. Refer to FIG. 18. A molding process of the light guide dot 400 provided in this embodiment of this application may include the following steps. First, a substrate 41 is provided, where the substrate 41 may use a material consistent with the light guide plate 22. Then, a layer of embossing resist 42 may be coated on the substrate 41. Then, the embossing resist 42 may be embossed by using a mold with an inverted trapezoidal protrusion, so that a trapezoidal dot structure 400 is formed on the embossing resist 42. Finally, the dot structure 400 is bonded on the lower surface of the light guide plate 22 using the optical adhesive 42 with a high refractive index. A refractive index of the optical adhesive 42 may be the same as the refractive index of the light guide plate 22, to reduce impact of the optical adhesive 42 on a light path.

In another possible implementation, the light guide dots 400 may be disposed on a lower side of the light guide plate 22, and the light guide surface 401 of the light guide dots 400 is used, so that light is partially fully reflected and partially refracted on the light guide surface 401, to achieve effect of high light output.

Figure 19:
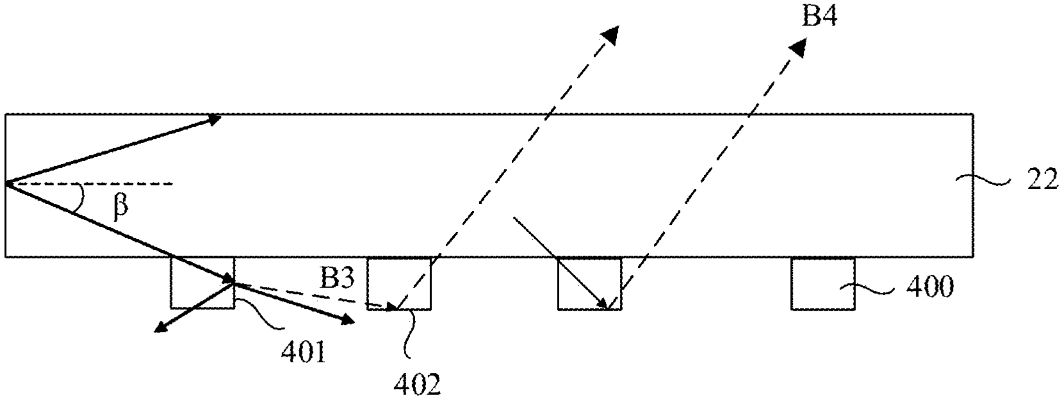
FIG. 19 is an example schematic diagram of light paths in a light guide plate and light guide dots according to an embodiment of this application.

FIG. 19 is a schematic diagram of light paths in a light guide plate and light guide dots according to an embodiment of this application. Refer to FIG. 19. The light guide dots 400 may be disposed as a columnar structure, and the plurality of light guide dots 400 are distributed on the lower side of the light guide plate 22. A top surface of the columnar structure is attached to a lower surface of the light guide plate 22. A side surface of the columnar structure forms the light guide surface 401. After light is irradiated on the light guide surface 401, the light is partially fully reflected to the electronic paper display panel 21 and is partially refracted. The refracted light may enter the electronic paper display panel 21, or may be irradiated to an adjacent light guide dot 400, as shown by light B3 in the figure, causing reverse light output. The light may also be irradiated on a bottom surface of the columnar structure, as shown by light B4 in the figure, resulting in reverse light output.

To reduce reverse light output, in this embodiment of this application, a shape and a size of the light guide dots 400 are more specifically limited, so that light B3 and light B4 are avoided.

Figure 20A:
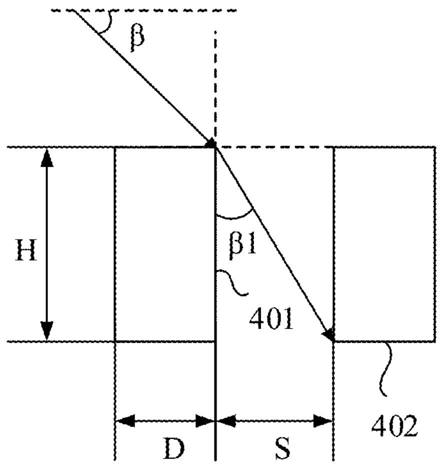
FIG. 20*a* is an example schematic diagram of a limiting case of propagation of light on two adjacent light guide dots according to an embodiment of this application.

FIG. 20*a* is a schematic diagram of a limiting case of propagation of light on two adjacent light guide dots according to an embodiment of this application. Refer to FIG. 20*a*.

An angle between incident light and a horizontal normal is β. After refraction, a refraction angle of the light is β1, a light guide dot 400 with a columnar structure has a width of D and a height of H, and a distance between two adjacent light guide dots 400 is S. According to the refraction law, n sin(90°−β)=n1 sin β1 and tan β1=S/H, it may be calculated that S=H*tan(arcsin((n/n1)sin(90°−β))). In summary, if emergent light of the light guide dot 400 cannot propagate to a next light guide dot 400 to cause reflection, the following needs to be satisfied:

$$S > H * \tan(\arcsin((n/n1)\sin(90^\circ - \beta))) \quad \text{Formula 3}$$

Figure 20B:
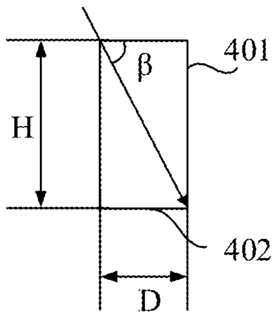
FIG. 20*b* is an example schematic diagram of a limiting case of reflection of light on a bottom surface of a light guide dot according to an embodiment of this application.

FIG. 20*b* is a schematic diagram of a limiting case of reflection of light on a bottom surface of a light guide dot according to an embodiment of this application. Refer to FIG. 20*b*. A cross section of the columnar structure is rectangular, the light guide dot 400 with the columnar structure has a width of D and a height of H. It can be learned from the triangle law that tan β=H/D. In this way, to keep incident light from entering the bottom surface 402 and enable the incident light to completely enter the light guide surface 401, to avoid reverse light output caused by reflection on the bottom surface 402, the following needs to be satisfied:

$$D/H \leq 1/\tan\beta \quad \text{Formula 4}$$

Figure 21:
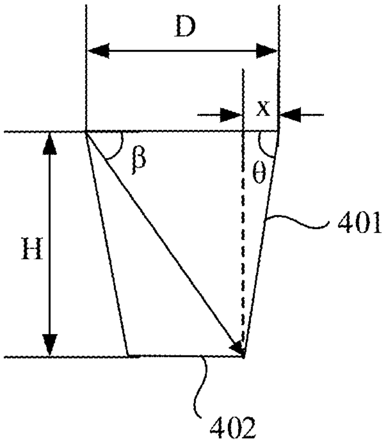
FIG. 21 is an example schematic diagram of limiting case of reflection of light on a bottom surface of another light guide dot according to an embodiment of this application.

FIG. 21 is a schematic diagram of limiting case of reflection of light on a bottom surface of another light guide dot according to an embodiment of this application. Refer to FIG. 21. The light guide dot 400 may be further disposed as an inverted trapezoidal structure close to a columnar structure. For the light guide dot 400 with the inverted trapezoidal structure, a top surface has a width of D, a height of H, and a vertex angle of θ. A vertical line is drawn from a right bottom point of an inverted trapezoid to a top surface 402. It is assumed that a di stance between an intersection of the vertical line and the top surface and a right vertex of the inverted trapezoid is x. It can be learned from a trigonometric function, tan β=H/(D−x), and tan θ=H/x. It may be obtained that in a limiting case, D/H=1/tan β+1/tan θ. In summary, to keep incident light from entering the bottom surface 402 and enable the incident light to completely enter the light guide surface 401, to avoid reverse light output caused by reflection on the bottom surface 402, the following needs to be satisfied:

$$D/H \leq 1/\tan\beta + 1/\tan\theta \quad \text{Formula 5}$$

It should be noted that, in this embodiment of this application, a shape of the light guide dot 400 with the columnar structure includes, but is not limited to, a cuboidal column, an inverted trapezoidal column, a cylindrical column, or the like.

Next, optional ranges of key factors are obtained through simulation results.

First, under a condition that D=30 um and H=20 um, different values of θ may be simulated to obtain corresponding values of the light output ratio, as shown in Table 4:

TABLE 4

| θ/° | D/um | H/um | Light output ratio |
|---|---|---|---|
| 80 | 30 | 20 | 106 |
| 85 | 30 | 20 | 218 |
| 86 | 30 | 20 | 268 |
| 87 | 30 | 20 | 410 |
| 88 | 30 | 20 | 848 |
| 89 | 30 | 20 | 4465 |

It can be learned from Table 4 that, if the width and the height of the light guide dot 400 are fixed, when the vertex angle θ is larger, the light output ratio is higher. Therefore, in this embodiment of this application, θ may be selected to be in a range of 80° to 90°.

Under a condition that θ=87° and D=30 um, different values of H may be simulated to obtain corresponding values of the light output ratio, as shown in Table 5:

TABLE 5

| θ/° | D/um | H/um | Light output ratio |
|---|---|---|---|
| 87 | 30 | 16 | 567 |
| 87 | 30 | 25 | 310 |
| 87 | 30 | 30 | 246 |

It can be learned from Table 5 that, if the width and the vertex angle of the light guide dot 400 are fixed, when the height H is smaller, the light output ratio is higher. In this embodiment of this application, H may be selected to be in a range of 1 um to 30 um.

Under a condition that θ=87°, H=16 um, and S is sufficiently large, different values of D may be simulated to obtain corresponding values of the light output ratio, as shown in Table 6:

TABLE 6

| θ/° | D/um | H/um | Light output ratio |
|---|---|---|---|
| 87 | 18 | 16 | 776 |
| 87 | 20 | 16 | 731 |
| 87 | 25 | 16 | 634 |

It can be learned from Table 6 that, if the height and the vertex angle of the light guide dot 400 are fixed, when the width D is smaller, the light output ratio is higher. In this embodiment of this application, D may be selected to be in a range of 10 um to 30 um.

Figure 22:
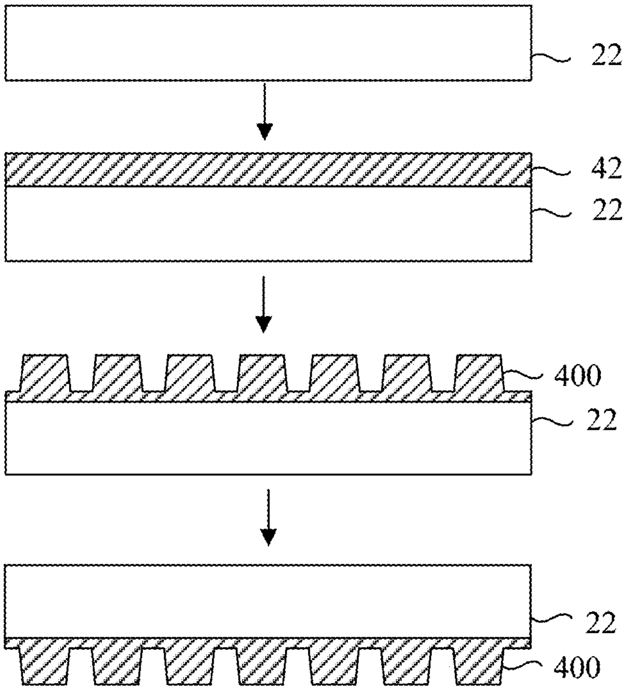
FIG. 22 is an example schematic flowchart of another manufacturing process of light guide dots according to an embodiment of this application.

FIG. 22 is a schematic flowchart of another manufacturing process of light guide dots according to an embodiment of this application. Refer to FIG. 22. A molding process of the light guide dots 400 provided in this embodiment of this application may include the following steps: First, a light guide plate 22 is provided as a substrate. Then, a layer of embossing resist 42 may be coated on the light guide plate 22. Then, the embossing resist 42 may be embossed by using a mold having a rectangular protrusion or an inverted trapezoid protrusion, so that a rectangular or trapezoidal dot structure 400 is formed on the embossing resist 42. Finally, the light guide plate 22 and the light guide dots 400 are turned upside down, to obtain the light guide dots 400 that are located below the light guide plate 22 and that have a rectangular or inverted trapezoid shape. It is not difficult to understand that, in this embodiment of this application, the light guide dots 400 may be directly formed by using a hot embossing process.

In still another possible implementation, the light guide dots 400 may be disposed on a lower side of the light guide plate 22, and the light guide surface 401 of the light guide dots 400 is used to destroy total reflection and downward light output on the light guide surface 401, to achieve effect of high light output.

Figure 23:
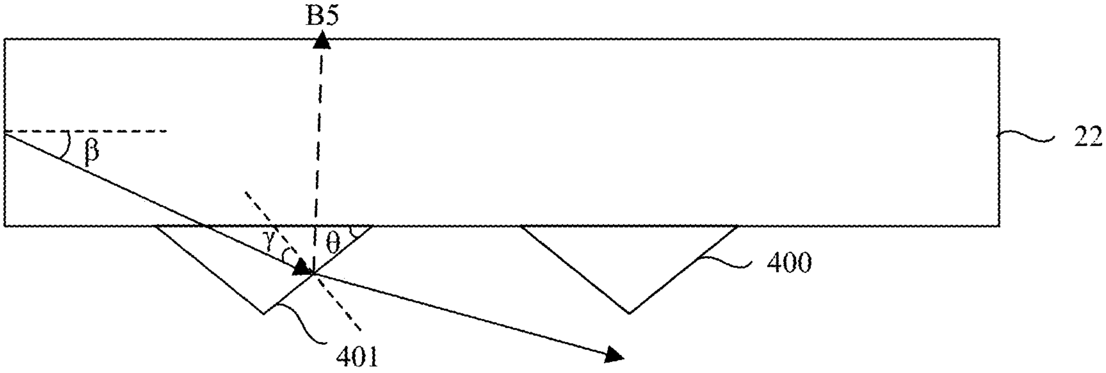
FIG. 23 is an example schematic diagram of light paths in a light guide plate and light guide dots according to an embodiment of this application.

FIG. 23 is a schematic diagram of light paths in a light guide plate and light guide dots according to an embodiment of this application. Refer to FIG. 23. The light guide dots 400 may be disposed as an inverted triangular structure. A plurality of light guide dots 400 are distributed on the lower side of the light guide plate 22. A side of the inverted triangular structure is attached to the lower surface of the light guide plate 22, a side surface away from the light input side forms the light guide surface 401, and the angle between the light guide surface 401 and the lower surface of the light guide plate 22 is $\theta$. Light is irradiated on the light guide surface 401, and an incident angle is $\gamma$. Part of the light is refracted, and light is emitted to the electronic paper display panel 21, and the other part may be completely refracted, as shown by light B5 in the figure, causing reverse light output.

To reduce reverse light output, in this embodiment of this application, a shape and a size of the light guide dots 400 are more specifically limited, so that light B5 is avoided.

It can be known from the refraction law that, a critical angle of total reflection of light entering the light guide surface 401 is $\gamma 0=\arcsin(n1/n)$. To avoid total reflection and upward propagation of light on the light guide surface 401, $\gamma<\gamma 0$ needs to be satisfied. According to the law that a sum of three angles of a triangle is equal to 180°, $\beta+\theta+90°+\gamma=180°$, and it may be obtained that $\gamma=90°-\beta+\theta$. In summary, to avoid total reflection and upward propagation of light on the light guide surface 401, the following needs to be satisfied:

$$\beta+\theta>90°-\arcsin(n1/n) \quad \text{Formula 6}$$

In this embodiment of this application, for a manufacturing manner of the light guide dots 400, refer to the foregoing embodiment. The light guide dots are formed by using a hot embossing process or an ultraviolet curing process.

In the foregoing embodiment of this application, the light guide dots 400 are disposed on the lower side of the light guide plate 22, and a plurality of manners of controlling light to be fully reflected to propagate downward, light to be refracted to propagate downward, total reflection of light to be destroyed to propagate upward, and the like are used, to reduce reverse light output and improve a light output ratio. In some other possible embodiments, the light guide dots 400 may be disposed on the upper side of the light guide plate 22, and light is controlled to be fully reflected to propagate downward, to reduce reverse light output.

Figure 24:
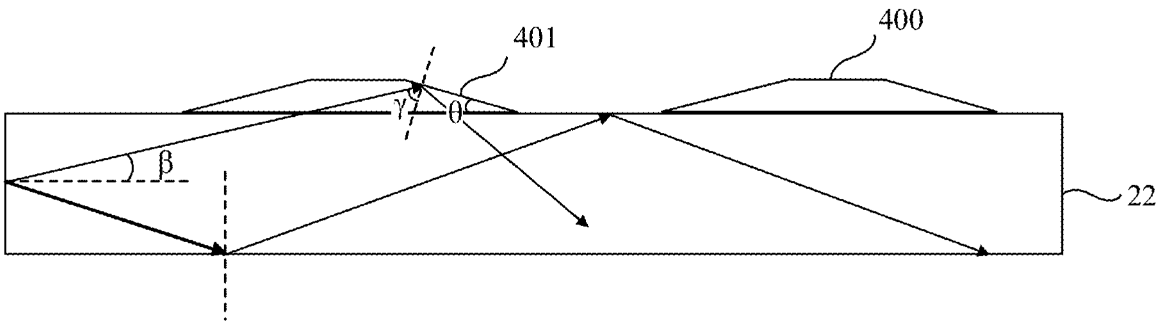
FIG. 24 is an example schematic diagram of light paths in a light guide plate and light guide dots according to an embodiment of this application.

FIG. 24 is a schematic diagram of light paths in a light guide plate and light guide dots according to an embodiment of this application. Refer to FIG. 24. The light guide dots 400 may be disposed as a trapezoidal structure. A plurality of light guide dots 400 are distributed on the upper side of the light guide plate 22. A bottom side of the trapezoidal structure is attached to the upper surface of the light guide plate 22, a waist away from the light input side forms the light guide surface 401, and the angle between the light guide surface 401 and the upper surface of the light guide plate 22 is $\theta$. Light is irradiated on the light guide surface 401, and an incident angle is $\gamma$. To implement forward light emission, in this embodiment of this application, structures of the light guide dots 400 may be disposed, so that the light is fully reflected downward on the light guide surface 401.

It can be known from the refraction law that, a critical angle of total reflection of light entering the light guide surface 401 is $\gamma 0=\arcsin(n1/n)$. To implement total reflection and downward propagation of light on the light guide surface 401, $\gamma>\gamma 0$ needs to be satisfied. According to the law that a sum of three angles of a triangle is equal to 180°, $\beta+\theta+90°+\gamma=180°$, and it may be obtained that $\gamma=90°\beta+\theta$. In summary, to avoid total reflection and upward propagation of light on the light guide surface 401, the following needs to be satisfied:

$$\beta+\theta<90°-\arcsin(n1/n) \quad \text{Formula 7}$$

Next, optional ranges of key factors are obtained through simulation results.

First, under a condition that D/H=1.41, different values of $\theta$, n1, and $\beta$ may be simulated to obtain corresponding values of the light output ratio, as shown in Table 7:

TABLE 7

| θ | n1 | β | Light output ratio |
|---|---|---|---|
| 10 | 1.47 | 22 | 2 |
| 20 | 1.47 | 22 | 1 |
| 30 | 1.47 | 22 | 3 |
| 40 | 1.47 | 22 | 5 |
| 30 | 1.47 | 22 | 3 |
| 30 | 1.3 | 35 | 1 |
| 30 | 1.25 | 38 | 1 |
| 30 | 1.0 | 50 | 2 |
| 30 | 1.0 | 30 | 26 |
| 30 | 1.0 | 25 | 95459 |
| 30 | 1.0 | 22 | 133329 |
| 30 | 1.3 | 22 | 3 |
| 30 | 1.3 | 16 | 52 |
| 30 | 1.3 | 15 | 1615210 |
| 30 | 1.25 | 38 | 1 |
| 30 | 1.25 | 18 | 89 |
| 30 | 1.25 | 17 | 1622457 |

It can be learned from Table 7 that, if a ratio of the width to the height of the light guide dot 400 and the angle between the light guide surface 401 and the light guide plate are fixed, when a value of n1 is larger and a value of the incident angle $\beta$ is larger, the light output ratio is higher, and may be greater than 1000. An implementation of this application may be combined with the foregoing solution of the light receiving element 300, to achieve a low incident angle $\beta$.

In this embodiment of this application, for a manufacturing manner of the light guide dots 400, refer to the foregoing embodiment. The light guide dots are formed by using a hot embossing process or an ultraviolet curing process.

It should be additionally noted that, in the foregoing embodiment, the light guide surface 401 is a side surface of the light guide dots 400 away from the light source 100, that is, a right side surface in the figure. It should be understood that the light source 100 is disposed on a left side of the light guide plate 22, and light emitted by the light source 100 propagates from left to right, and does not propagate to a left side surface of the light guide dots 400, but enters the light guide dots 400 from a top surface or a bottom surface that is of the light guide dots 400 and that is connected to the light guide plate 22. Then, reflection or refraction occurs on the right side surface (that is, the light guide surface 401 defined above) of the light guide dots 400.

Theoretically, part of light is reflected back after propagating to a right side of the light guide plate 22, propagates from right to left, and may be reflected or refracted on the left side surface of the light guide dots 400. However, this part of light occupies a low proportion, and is not considered in this embodiment of this application. Therefore, a shape of a side of the light guide dot 400 close to the light source 100 may not be specifically limited, and the shape of the light guide dot 400 may be implemented in more manners. For example, for the light guide dots 400 with the trapezoidal structure provided in FIG. 16, a left waist of the light guide dot does not need to be symmetric to the light guide surface 401, that is, the light guide dots 400 with the trapezoidal structure may not be an isosceles trapezoid, for example, may be a right-angled trapezoid, to be more conducive to process forming of the light guide dots 400.

In addition, it should be noted that a location arrangement of the light guide dots 400 also affects display effect.

Figure 25:
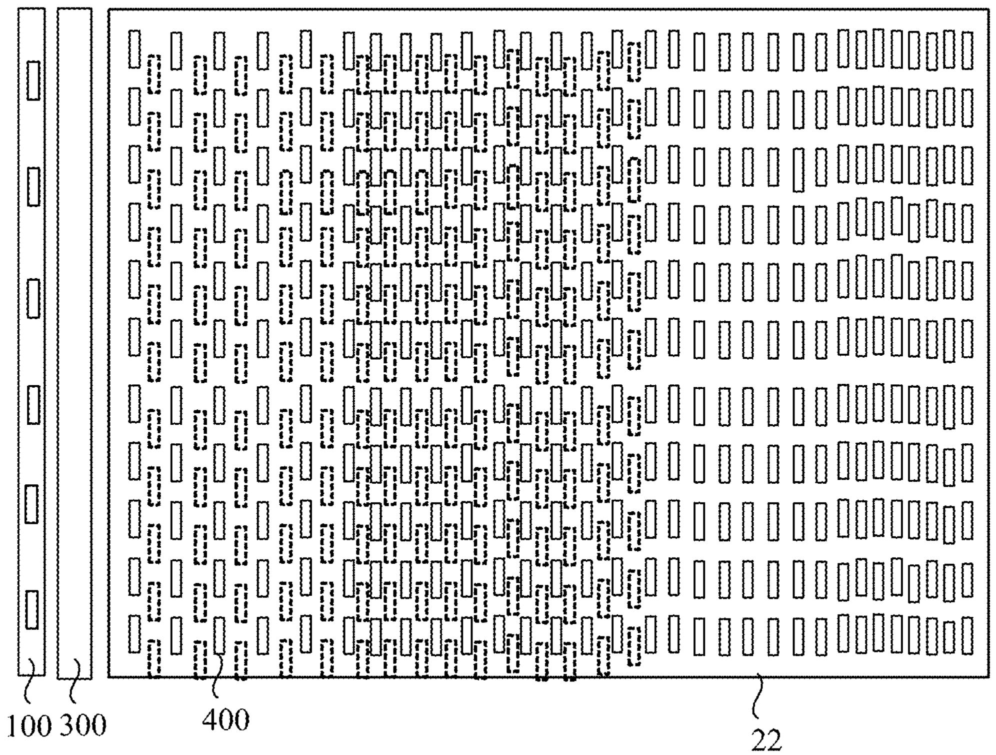
FIG. 25 is an example schematic diagram of arrangement of light guide dots according to an embodiment of this application.

FIG. 25 is a schematic diagram of arrangement of light guide dots according to an embodiment of this application. Refer to FIG. 25. In a possible implementation, the plurality of light guide dots 400 have the same structure and size, for example, may have the trapezoidal structure provided in the foregoing embodiment. The plurality of light guide dots 400 disposed at intervals are arranged in rows in a direction consistent with an extension direction of the light source 100, and light guide dots 400 in two adjacent rows are arranged in a staggered manner, to resolve a problem of bright and dark stripes caused by refractive dots, so that light output is more uniform and consistent. A distance between two adjacent rows gradually decreases from a side close to the light source 100 to a side far away from the light source 100. To be specific, light guide dots 400 on the side close to the light source 100 are distributed more sparsely, and light guide dots 400 on the side far away from the light source 100 are distributed more densely, to resolve a problem that light output efficiency on the side far away from the light source 100 decreases.

Figure 26:
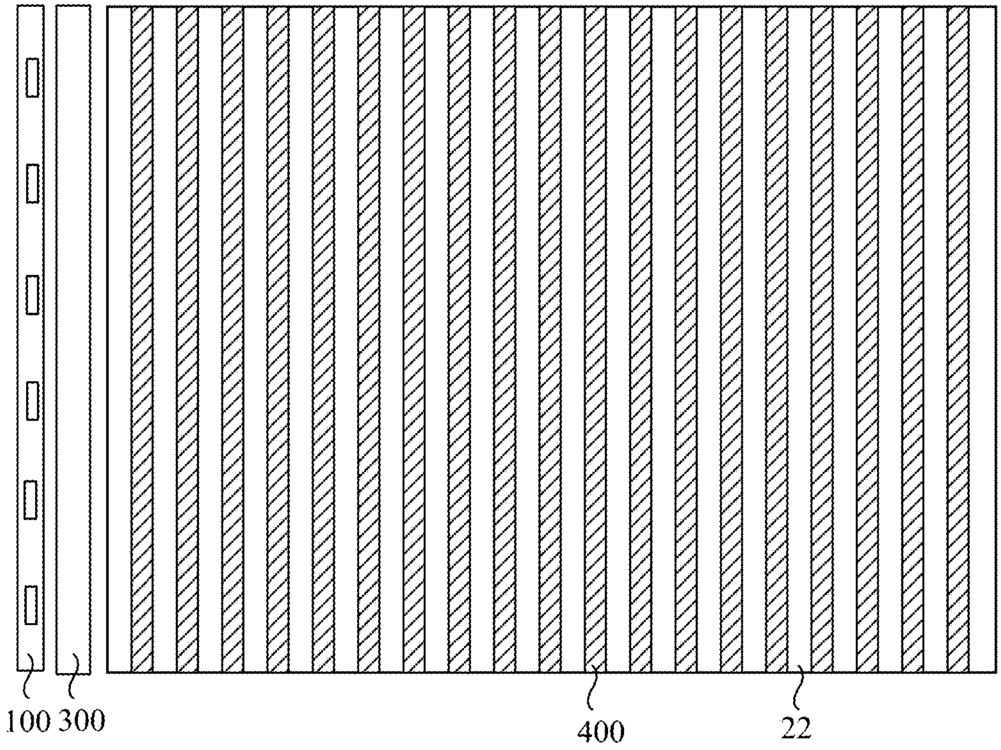
FIG. 26 is an example schematic diagram of arrangement of light guide dots according to an embodiment of this application.
Figure 27:
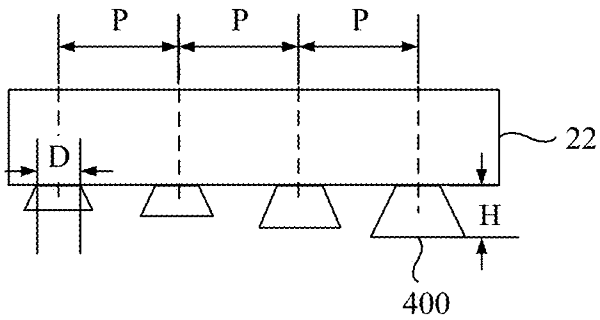
FIG. 27 is an example schematic diagram of structures of the light guide dots in FIG. 26.

FIG. 26 is a schematic diagram of arrangement of light guide dots according to an embodiment of this application. FIG. 27 is a schematic diagram of structures of light guide dots in FIG. 26. Refer to FIG. 26 and FIG. 27. In another possible implementation, the light guide dots 400 may have, for example, the trapezoidal structure provided in the foregoing embodiment. Widths D of bottom surfaces that are of the plurality of light guide dots 400 and that are connected to the light guide plate 22 remain the same, the angle between the light guide surface and the light guide plate 22, that is, vertex angles of the trapezoidal structure, also remain the same, and heights H of the plurality of light guide dots 400 are different. The light guide dots 400 may extend in a direction consistent with the extension direction of the light source 100. A plurality of light guide dots 400 are arranged at intervals. A center distance P between every two adjacent light guide dots 400 remains the same. Heights of the plurality of light guide dots 400 gradually increase from the side close to the light source 100 to the side far away from the light source 100. That is, a height of a light guide dot 400 on the side close to the light source 100 is small, and a height of a light guide dot 400 on the side far away from the light source 100 is large. The heights of the dots are changed, so that a problem that light output efficiency of the side far away from the light source 100 decreases can be resolved, and light output uniformity of an entire surface can be implemented.

In a specific implementation, the center distance P between every two adjacent light guide dots 400 may be in a range of 20 um to 500 um, and preferably may be in a range of 50 um to 200 um. A ratio H/D of a height H to a width D may be in a range of 0.1 to 10, and preferably may be in a range of 0.1 to 2.

It is not difficult to understand that, based on a principle same as that in the foregoing implementations, light uniformity of the entire surface may be implemented by changing the angle between the light guide surface and the light guide plate 22, that is, a vertex angle of the trapezoidal structure, or changing a value of the width D.

It should be additionally noted that, in the frontlight module provided in this embodiment of this application, the structures such as the light guide dots, the light receiving element, and the like are disposed to reduce reverse light output. This improvement is applicable to different types of display panels. In addition to the electronic paper display panel, the display panel may be an LCD, an LCOS, or the like, to form display apparatuses such as a reflective liquid crystal display, an LCOS projector, and the like, to improve display effect of these different types of display apparatuses.

According to the frontlight module and the display apparatus provided in this embodiment of this application, the light guide dots having a specific shape and a specific angle are disposed, so that light is coupled to the side of the display panel to a maximum extent. In this way, reverse light output can be greatly reduced, and a problem of picture decoloring can be resolved. In addition, the light receiving element is additionally disposed between the light source and the light guide plate, and an emission angle of the light source is reduced to a specific extent, so that a divergence angle of light that enters the light guide plate is greater than a critical angle of total reflection, and propagation of light in the light guide plate is limited. In addition, the light receiving element narrows a light emitting angle, and can reduce light leakage on a light input side, to reduce a width of a bezel of the display apparatus.

Finally, it should be noted that the foregoing embodiments are merely intended for describing the technical solutions in embodiments of this application rather than limiting this application. Although embodiments of this application are described in detail with reference to the foregoing embodiments, persons of ordinary skill in the art should understand that they may still make modifications to the technical solutions described in the foregoing embodiments or make equivalent replacements to some or all the technical features thereof, without departing from the scope of the technical solutions of embodiments of this application.

What is claimed is:

1. A frontlight module configured for disposing on a side of a display panel, the frontlight module comprising:
- a light source;
- a light guide plate; and
- a plurality of light guide dots, wherein
  - the light guide plate includes a first surface and a second surface disposed opposite to each other,
  - the display panel is disposed facing the second surface,
  - the light source is disposed on a side surface of the light guide plate,
  - the plurality of light guide dots are disposed on the second surface of the light guide plate,
  - each light guide dot, from the plurality of light guide dots, has a trapezoidal structure,
  - each light guide dot, from the plurality of light guide dots, has a light guide surface disposed at an angle with respect to a surface of the light guide plate,
  - a top surface of the trapezoidal structure is connected to the second surface,
  - a waist on a side of the trapezoidal structure away from the light source forms the light guide surface,
  - the angle between the light guide surface and the surface of the light guide plate is θ, an incident angle of light on the side surface of the light guide plate is β, and β and θ satisfy:

$$\beta+\theta\geq 90°+\arcsin(n1/n)$$

wherein n is a refractive index of the light guide plate, n1 is a refractive index of an outer side medium of the light guide plate, light is fully reflected and/or refracted on the light guide surfaces and propagates to the display panel, a width of the top surface of the trapezoidal structure is D, a height of the trapezoidal structure is H, and D and H satisfy:

$$D/H\leq 1/\tan\beta-\tan(\theta-90°)$$

wherein θ is the angle between the light guide surface and the surface of the light guide plate, β is an incident angle of light on the side surface of the light guide plate, a width of a bottom surface, of each of the plurality of light guide dots, connected to the light guide plate is the same, vertex angles of the trapezoidal structure of each light guide dot are the same, and heights of the plurality of light guide dots gradually increase from a side close to the light source to a side away from the light source.

2. The frontlight module according to claim 1, further comprising:

a light receiving element, wherein the light receiving element is connected between the light source and the light guide plate, and the light receiving element is configured to converge light emitted by the light source and enable an emission angle of incident light that enters the light guide plate to be within a preset angle range.

3. The frontlight module according to claim 1, further comprising:

a refractive index buffer layer, wherein the refractive index buffer layer is disposed on a side of the light guide plate facing the light guide dots, a refractive index, of the refractive index buffer layer, is less than the refractive index of the light guide plate, and the refractive index buffer layer is within a range of 1.2 to 1.6.

4. The frontlight module according to claim 1, wherein a distance between two adjacent rows of light guide dots, from the plurality of light guide dots, gradually decreases from a side near the light source to a side away from the light source so that the light guide dots on the side near the light source are distributed sparsely, and the light guide dots on the side away from the light source are distributed densely.

5. The frontlight module according to claim 1, wherein a center distance P between every two adjacent light guide dots is within a range of 50 μm to 200 μm, and a ratio H/D of a height H to a width D of each light guide dot is within a range of 0.1 to 2.

6. The frontlight module according to claim 2, wherein the light receiving element includes a microstructural film bonded to the side surface of the light guide plate using an optical adhesive.

7. The frontlight module according to claim 2, wherein the preset angle range is −35° to +35°.

8. The frontlight module according to claim 6, wherein the microstructural film includes a plurality of light blocking grids, an extension direction of the plurality of light blocking grids is perpendicular to a thickness direction of the light guide plate, the plurality of light blocking grids are arranged at intervals in a thickness direction of the light guide plate, and a light transmission region is between two adjacent light blocking grids of the plurality of light blocking grids.

9. The frontlight module according to claim 8, wherein a cross section of each light blocking grid, of the plurality of light blocking grids, in the thickness direction of the light guide plate is a triangle, and a sharp angle of the triangle faces a side proximate to the light guide plate.

10. A display apparatus, comprising:

a display panel; and a frontlight module, wherein the display panel is connected to the frontlight module using an optical adhesive, the frontlight module is disposed on a side of the display panel, and the frontlight module comprises:

a light source;

a light guide plate; and a plurality of light guide dots, wherein the light guide plate includes a first surface and a second surface disposed opposite to each other, the display panel is disposed facing the second surface, the light source is disposed on a side surface of the light guide plate, the plurality of light guide dots are disposed on the second surface of the light guide plate, each light guide dot, from the plurality of light guide dots, has a trapezoidal structure, each light guide dot, from the plurality of light guide dots, has a light guide surface disposed at an angle with respect to a surface of the light guide plate, a top surface of the trapezoidal structure is connected to the second surface, a waist on a side of the trapezoidal structure away from the light source forms the light guide surface, the angle between the light guide surface and the surface of the light guide plate is Θ, an incident angle of light on the side surface of the light guide plate is β, and β and θ satisfy:

$$\beta+\theta\geq 90°+\arcsin(n1/n)$$

wherein n is a refractive index of the light guide plate, n1 is a refractive index of an outer side medium of the light guide plate, light is fully reflected and/or refracted on the light guide surfaces and propagates to the display panel, a width of a bottom surface, of each of the plurality of light guide dots, connected to the light guide plate is the same, vertex angles of the trapezoidal structure of each light guide dot are the same, heights of the plurality of light guide dots gradually increase from a side close to the light source to a side away from the light source, a width of the top surface of the trapezoidal structure is D, a height of the trapezoidal structure is H, and D and H satisfy:

$$D/H \leq 1/\tan\beta - \tan(\theta - 90°)$$

wherein θ is the angle between the light guide surface and the surface of the light guide plate, and β is an incident angle of light on the side surface of the light guide plate.

11. The display apparatus according to claim 10, wherein the frontlight module further comprises a light receiving element, the light receiving element is connected between the light source and the light guide plate, and the light receiving element is configured to converge light emitted by the light source and enable an emission angle of incident light that enters the light guide plate to be within a preset angle range.

12. The display apparatus according to claim 11, wherein the light receiving element includes a microstructural film bonded to the side surface of the light guide plate using an optical adhesive.

13. The display apparatus according to claim 12, wherein the microstructural film includes a plurality of light blocking grids, an extension direction of the plurality of light blocking grids is perpendicular to a thickness direction of the light guide plate, the plurality of light blocking grids are arranged at intervals in a thickness direction of the light guide plate, and a light transmission region is between two adjacent light blocking grids of the plurality of light blocking grids.

14. The display apparatus according to claim 13, wherein a cross section of each light blocking grid, of the plurality of light blocking grids, in the thickness direction of the light guide plate is a triangle, and a sharp angle of the triangle faces a side proximate to the light guide plate.

15. A frontlight module configured for disposing on a side of a display panel, the frontlight module comprising:

a light source;

a light guide plate; and a plurality of light guide dots, wherein the light guide plate includes a first surface and a second surface disposed opposite to each other, the display panel is disposed facing the second surface, the light source is disposed on a side surface of the light guide plate, the plurality of light guide dots are disposed on the second surface of the light guide plate, each light guide dot, from the plurality of light guide dots, has a columnar structure, each light guide dot, from the plurality of light guide dots, has a light guide surface disposed at an angle with respect to a surface of the light guide plate, a side surface of the columnar structure away from the light source forms the light guide surface, first light is reflected on the light guide surface and propagates to the display panel, second light is refracted on the light guide surface and propagates to the display panel, light guide dots, from the plurality of light guide dots, in two adjacent rows are arranged in a staggered manner, a center distance P between every two adjacent light guide dots is within a range of 20 μm to 500 μm, and a ratio H/D of a height H to a width D of each light guide dot is within a range of 0.1 to 10.

16. The frontlight module according to claim 15, wherein a distance between two adjacent light guide dots is S, and S satisfies:

$$S > H^{*}\tan(\arcsin((n/n1)\sin(90° - \beta)))$$

wherein H is the height of the columnar structure, n is a refractive index of the light guide plate, n1 is a refractive index of an outer side medium of the light guide plate, and β is an incident angle of light on the side surface of the light guide plate.

17. The frontlight module according to claim 15, wherein a cross section of the columnar structure is a rectangle, the width of the rectangle is D, the height of the rectangle is H, and D and H satisfy:

$$D/H \leq 1/\tan\beta$$

wherein β is the incident angle of light on the side surface of the light guide plate.

18. The frontlight module according to claim 15, wherein a cross section of the columnar structure is an inverted trapezoid, a top surface of the inverted trapezoid is connected to the second surface, the width of the top surface of the inverted trapezoid is D, the height of the inverted trapezoid is H, and D and H satisfy:

$$D/H \leq 1/\tan\beta + 1/\tan\theta$$

wherein β is the incident angle of light on the side surface of the light guide plate, θ is the angle between the light guide surface and the surface of the light guide plate, and the angle θ between the light guide surface and the surface of the light guide plate is between 80° and 90°.

19. The frontlight module according to claim 15, wherein the center distance P is preferably within the range of 50 μm to 200 μm, and the ratio H/D is preferably within the range of 0.1 to 2.

* * * * *